United States Patent
Omori et al.

(10) Patent No.: US 7,553,113 B2
(45) Date of Patent: Jun. 30, 2009

(54) INDEXABLE INSERT AND METHOD OF MANUFACTURING THE SAME

(75) Inventors: Naoya Omori, Itami (JP); Yoshio Okada, Itami (JP); Minoru Itoh, Itami (JP); Norihiro Takanashi, Itami (JP); Shinya Imamura, Itami (JP); Susumu Okuno, Itami (JP)

(73) Assignee: Sumitomo Electric Industries, Ltd, Osaka (JP)

( * ) Notice: Subject to any disclaimer, the term of this patent is extended or adjusted under 35 U.S.C. 154(b) by 0 days.

(21) Appl. No.: 11/813,168

(22) PCT Filed: Dec. 15, 2005

(86) PCT No.: PCT/JP2005/023018

§ 371 (c)(1),
(2), (4) Date: Jun. 29, 2007

(87) PCT Pub. No.: WO2006/080154

PCT Pub. Date: Aug. 3, 2006

(65) Prior Publication Data

US 2008/0131218 A1  Jun. 5, 2008

(30) Foreign Application Priority Data

Jan. 26, 2005  (JP) ............... 2005-018732

(51) Int. Cl.
*B23C 5/00*  (2006.01)
*B23C 9/00*  (2006.01)

(52) U.S. Cl. ...................... 407/113; 407/115

(58) Field of Classification Search ......... 407/113–119, 407/11, 120
See application file for complete search history.

(56) References Cited

U.S. PATENT DOCUMENTS

| 5,442,981 | A * | 8/1995 | Vegh ..................... 82/1.11 |
| 5,861,210 | A | 1/1999 | Lenander et al. |
| 6,599,062 | B1 * | 7/2003 | Oles et al. .................. 407/119 |
| 2002/0039521 | A1 | 4/2002 | Votsch et al. |
| 2002/0187370 | A1 | 12/2002 | Yamagata et al. |

FOREIGN PATENT DOCUMENTS

| JP | 55-100978 | 8/1980 |
| JP | 58-55801 | 4/1983 |
| JP | 58-88501 | 4/1983 |

(Continued)

*Primary Examiner*—Willmon Fridie
(74) *Attorney, Agent, or Firm*—Ditthavong Mori & Steiner, P.C.

(57) ABSTRACT

The present invention provides an indexable insert (1) which includes a body (8), a base layer disposed on the body (8), and a wear-indicating layer disposed on a part of the base layer, wherein at least one surface of the body (8) serves as a rake face (2), at least one other surface of the body serves as a flank face (3), the rake face (2) being connected to the flank face (3) with a cutting edge (4) therebetween, the base layer has a color different from that of the wear-indicating layer, and the wear-indicating layer is disposed on the rake face and on the base layer entirely or partially in a region A2 other than a region A1 that extends to a distance of 0.2 mm or more and less than 4.0 mm from the cutting edge.

15 Claims, 4 Drawing Sheets

FOREIGN PATENT DOCUMENTS

| | | |
|---|---|---|
| JP | 4-201103 A | 7/1992 |
| JP | 8-52603 | 2/1996 |
| JP | 2002-144108 | 5/2002 |
| JP | 2004-50385 | 2/2004 |
| WO | WO 02/04156 A1 | 1/2002 |
| WO | PCT/JP2005/023018 | 3/2006 |

* cited by examiner

INDEXABLE INSERT AND METHOD OF MANUFACTURING THE SAME

TECHNICAL FIELD

The present invention relates to indexable inserts used in cutting tools for machining and methods for producing the same. More particularly, the invention relates to an indexable insert which is particularly useful as a indexable insert for drilling, end milling, milling, or turning, or as an insert for metal-slitting saw machining, gear-cutting tool machining, reamer machining, tap machining, crankshaft pin milling, or the like, and a method for producing the same.

BACKGROUND ART

Turning tools and milling tools are provided with one or a plurality of indexable inserts. As shown in FIG. 1, such an indexable insert 1 includes a rake face 2 that is located on the side at which a chip 6 of a workpiece 5 is lifted up during cutting and a flank face 3 that rake faces the workpiece itself. The rake face 2 is connected to the flank face 3 with a cutting edge 4 therebetween, and the cutting edge 4 acts as a main point of action for cutting the workpiece 5.

In such an indexable insert, when the tool life expires, the edge must be replaced. In the case of an insert that has only one cutting edge, the insert itself must be replaced. However, in the case of an indexable insert that has a plurality of cutting edges, by turning the cutting insert several times on the same bearing surface, i.e., by placing an unused cutting edge at the cutting position, a different cutting edge may be used. In some cases, the cutting edge may be refixed on another bearing surface and an unused cutting edge may be used thereon.

However, in cutting worksites, there are often cases where an indexable insert is replaced or turned even though a cutting edge thereof has not yet been used. The reason for this is that when the cutting insert is replaced or the cutting edge is turned, it is not recognized whether the cutting edge has been used or has not yet been used. Consequently, it is necessary to perform such an operation after thoroughly checking whether the cutting edge has been used or has not yet been used.

As the method for easily identifying used cutting edges, an indexable insert has been proposed in which a flank face and a rake face have different colors (Japanese Unexamined Patent Application Publication No. 2002-144108 (Patent Reference 1)). Specifically, in this indexable insert, a wear-resistant base layer referred to as a wear-reducing coating is disposed on a body, and a wear-indicating layer composed of a material susceptible to wear is disposed on a flank face.

However, although the indexable insert having the structure described above has an alerting function to indicate whether or not the cutting edge has been used, the material constituting the wear-indicating layer disposed on the flank face is easily welded on the workpiece, and thus the material constituting the wear-indicating layer may be welded on the surface of the workpiece, or the workpiece material may be welded on the wear-indicating layer to cause an irregular edge, and cutting may be performed with the irregular edge. As a result, the appearance and surface smoothness of the workpiece after cutting may be impaired.

Furthermore, as in the case described above, in an indexable insert in which a wear-indicating layer is provided on a flank face, when the cutting insert is placed in a storage case or placed on a working table in the vicinity of a machine tool, it is not easy to identify which cutting edge has been used, which is disadvantageous. The reason for this is that since the flank face usually has a smaller area than the rake face, the cutting insert is often placed with the rake face up in a storage case, and also placed with the rake face up on a working table. As a result, the flank face is in a position difficult to observe visually.

Patent Reference 1: Japanese Unexamined Patent Application Publication No. 2002-144108

DISCLOSURE OF INVENTION

Problems to be Solved by the Invention

The present invention has been achieved to solve the problems described above. It is an object of the present invention to provide an indexable insert which does not impair the appearance and surface smoothness of a workpiece and which can effectively provide an alerting function that is easily seen visually.

Means for Solving the Problems

In order to solve the problems, the present inventor has intensively studied the contact state between an indexable insert and a workpiece during cutting and has found, on the basis of the fact that, as shown in FIG. 1, the cutting edge 4 of the indexable insert 1 is in contact with the workpiece 5, the rake face 2 thereof is located on the side of the chip 6, and the flank face 3 faces the workpiece 5, that if a wear-indicating layer is disposed on a specific part of the rake face 2, it might be possible to prevent the material constituting the wear-indicating layer from being welded on the surface of the workpiece after cutting. As a result of further studies based on this finding, the present invention has been completed.

That is, the present invention relates to an indexable insert including a body, a base layer disposed on the body, and a wear-indicating layer disposed on a part of the base layer, wherein at least one surface of the body serves as a rake face, at least one other surface of the body serves as a flank face, the rake face being connected to the flank face with a cutting edge therebetween, the base layer has a color different from that of the wear-indicating layer, and the wear-indicating layer is disposed on the rake face and on the base layer entirely or partially in a region A2 other than a region A1 that extends to a distance of 0.2 mm or more and less than 4.0 mm from the cutting edge. The wear-indicating layer may be disposed on the rake face and further in the region A1.

Preferably, at least one layer constituting the base layer has compressive residual stress in at least a part of an area in which the wear-indicating layer is not disposed and which participates in cutting. More preferably, the absolute value of the compressive residual stress is 0.1 GPa or more.

Preferably, the relationship 1.0>A/B is satisfied, wherein A (μm) represents the surface roughness Ra of the region A1, and B (μm) represents the surface roughness Ra of the region A2. Furthermore, the indexable insert may have a plurality of cutting edges.

The wear-indicating layer may be a layer that is more susceptible to wear than the base layer. Preferably, an outermost layer of the base layer is an $Al_2O_3$ layer or a layer containing $Al_2O_3$.

Preferably, in the base layer, at the cutting edge which participates in cutting, a layer other than the $Al_2O_3$ layer or the layer containing $Al_2O_3$, which is the outermost layer, is entirely or partially exposed to the surface.

Preferably, an outermost layer of the wear-indicating layer is made of at least one metal (element) selected from the group consisting of Group IVa elements (Ti, Zr, Hf, etc.), Group Va elements (V, Nb, Ta, etc.), and Group VIa elements (Cr, Mo, W, etc.) in the periodic table, Al, Si, Cu, Pt, Au, Ag, Pd, Fe, Co, and Ni, or an alloy containing the metal, or is made of a compound containing at least one element selected from the group consisting of Group IVa elements, Group Va elements, and Group Via elements in the periodic table, Al, and Si, and at least one element selected from the group consisting of carbon, nitrogen, oxygen, and boron.

Furthermore, the body may be made of any one of cemented carbides, cermets, high-speed steels, ceramics, sintered cubic boron nitride compacts, sintered diamond compacts, sintered silicon nitride compacts, and mixtures of aluminum oxide and titanium carbide.

Furthermore, the indexable insert may be any one of indexable inserts for drilling, end milling, milling, or turning and inserts for metal-slitting saw machining, gear-cutting tool machining, reamer machining, tap machining, or crankshaft pin milling.

Furthermore, the present invention relates to a method for producing an indexable insert including a body, a base layer disposed on the body, and a wear-indicating layer disposed on a part of the base layer, the method including a step of forming the base layer on the body, a step of forming the wear-indicating layer on the base layer, the wear-indicating layer having a color different from that of the base layer, and a step of removing the wear-indicating layer formed in a region located on a rake face of the body and including at least a region A1 which extends to a distance of 0.2 mm or more and less than 4.0 mm from a cutting edge and formed on a flank face of the body.

In such an indexable insert according to the present invention, as described above, at least one surface serves as a rake face and at least one other surface serves as a flank face, the rake face being connected to the flank face with a cutting edge therebetween, and a wear-indicating layer is disposed on a specific part of the rake face, the wear-indicating layer having a color different from the color of a layer disposed on the flank face (i.e., the color of the base layer).

In such a case, preferably, the wear-indicating layer is formed so as to have the highest possible chromatic contrast with the base layer. The wear-indicating layer disposed on the specific part of the rake face is formed so that a clear trace of machining remains and the wear-indicating layer at least partially wears off to expose the underlying layer having a different color (i.e., the base layer) after cutting for a shortest possible period of time, for example, several seconds to several minutes. According to a possible embodiment, preferably, the wear-indicating layer has poor wear resistance, is more susceptible to wear than the base layer, and exhibits low adhesion to the base layer.

On the other hand, the wear-indicating layer may be designed such that the wear-indicating layer changes color immediately after use of the indexable insert. Furthermore, the wear-indicating layer may change color (including the case in which the wear-indicating layer appears to have changed color) when chips adhere thereto and lubricant or the like adheres thereto.

Alternatively, in order to indicate that a cutting edge adjacent to the relevant wear-indicating layer has been used, the wear-indicating layer may change color in a different manner. For example, the wear-indicating layer may be heat-sensitive such that only the portion near the cutting edge changes color at a temperature exceeding 200° C. Desirably, the change in color occurs as a result of oxidation or other changes, and is irreversible. Even when the adjacent cutting edge is used only for a short period of time, if the specific part of the rake face adjacent to the cutting edge exceeds a predetermined temperature at least for a short period of time, the wear-indicating layer changes color, and the change in color can be clearly recognized continuously. The change in color caused by the action of heat is advantageous in that the used cutting edge can be easily identified because the color change occurs not only in the part that is directly brought into contact with the workpiece during use but also in a wide area of the rake face that is brought into contact with hot chips.

Depending on whether or not a trace of machining or a change in color occurs in the wear-indicating layer, it is possible to simply and easily identify whether the indexable insert has been used or which cutting edge has not yet been used. In other words, the wear-indicating layer has an alerting function. Therefore, the indexable insert can be appropriately replaced or appropriately turned. In particular, the cases in which an indexable insert which has been used and needs to be replaced is not noticed, an unused indexable insert is replaced with a new one without being used, a cutting edge which has been used is set at the cutting position when an indexable insert is turned, and an unused cutting edge is left to stand unused can be avoided. Consequently, the maintenance of the cutting tool can be greatly simplified by the indexable insert according to the present invention.

In the indexable insert of the present invention, not only such an alerting function is displayed, but also the wear-indicating layer is disposed only on a specific part of the rake face. Consequently, the problem, such as the one associated with the known art, that the appearance and surface smoothness of a workpiece after cutting are impaired is cleared, which is a remarkable working effect. In the known indexable insert provided with the alerting function, since the wear-indicating layer is disposed on the flank face, the workpiece material is welded on the wear-indicating layer, resulting in impairment to the appearance of the workpiece after cutting, and degradation of the surface roughness. In addition, because of the increase in cutting force, the edge may be fractured in some cases. Therefore, the type and use of the workpiece are limited, and also there may be a case in which cutting cannot be performed using such an indexable insert. The present invention has overcome all the problems described above, and its industrial applicability is significantly large.

In addition, in the indexable insert of the present invention, since the wear-indicating layer is disposed on the specific part of the rake face, even in the case where the cutting insert is placed in a storage case or placed on a working table in the vicinity of a machine tool, it is possible to easily identify which cutting edge has been used, which is highly advantageous.

Preferably, the wear-indicating layer is formed so as to have a light color, for example, to be yellow or to have a yellowish luster (such as gold), and the base layer which constitutes the surface of the flank face is formed so as to have a blackish color. For example, the base layer is made of aluminum oxide ($Al_2O_3$) or a film containing $Al_2O_3$. Furthermore, another layer may be provided on and/or under the $Al_2O_3$ layer.

The indexable insert of the present invention can be produced by stacking the individual layers, and the $Al_2O_3$ layer which is the base layer serves as a wear-resistant layer. In the present invention, the wear-resistant layer is defined as a film that increases the wear resistance of the edge in use for machining, and thus prolonging the tool life and increasing the cutting speed.

Such a wear-resistant layer may be provided with an auxiliary surface layer. Furthermore, instead of the $Al_2O_3$ layer, a wear-resistant layer that has the same or superior characteristics may be used.

In order to produce an indexable insert according to the present invention, first, a film containing an $Al_2O_3$ layer serving as a wear-resistant layer is formed over the entire surface of a body. As a top layer, for example, a nitride layer (such as TiN) which serves as a wear-indicating layer can be formed. The nitride layer may be formed so as to cover the entire surface of the base layer, and then removed from the flank face and a specific part of the rake face.

In particular, the nitride layer used as the wear-indicating layer must be removed from a region A1 which is located on the rake face and which extends to a distance of 0.2 mm or more and less than 4.0 mm from the cutting edge. The removal may be performed by any method. For example, a mechanical removing process, such as brushing, a barrel processing, or blasting (sandblasting), may be used.

When brushing or blasting is performed, post-treatment of the flank face and the area near the cutting edge is simultaneously performed, and thus the flank face and the area near the cutting edge are smoothed. This reduces welding with respect to the workpiece, and also contributes to the improvement of the life of the indexable insert. By masking the part where the wear-indicating layer is to be left, the wear-indicating layer is allowed to remain without being removed.

Advantages

Since the indexable insert of the present invention has the structure described above, the appearance and surface smoothness of the workpiece are not impaired, and the alerting function that is easily seen visually can be displayed effectively.

REFERENCE NUMERALS

Figure 1:
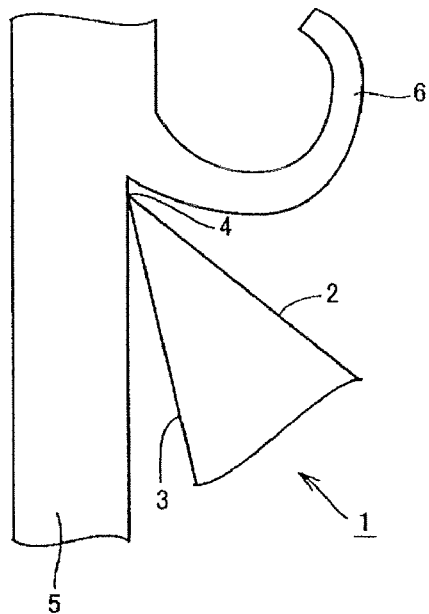
FIG. 1 is a schematic diagram which shows a contact state between an indexable insert and a workpiece during cutting.

| | |
|---|---|
| 1 | indexable insert |
| 2 | rake face |
| 3 | flank face |
| 4 | cutting edge |
| 5 | workpiece |
| 6 | chip |
| 7 | through-hole |
| 8 | body |
| 9 | discolored section |
| 10 | discolored section |
| 11 | coating |
| 12 | base layer |
| 13 | wear-indicating layer |
| 120 | alumina layer |
| 121 | underlying layer |

BEST MODE FOR CARRYING OUT THE INVENTION

The present invention will be described in more detail below. Embodiments will be described with reference to the drawings. In the drawings of the present application, the same reference numerals are used to designate the same or corresponding elements. Each drawing is a schematic one for illustration purposes only. The dimensional ratio of the thickness of a coating to a body and the dimensional ratio of the corner radius (R) indicated therein are different from the actual values.

<Indexable Insert and Body>

Figure 2:
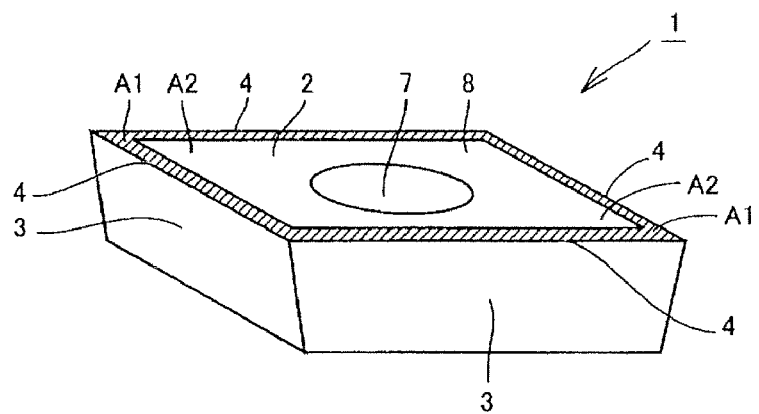
FIG. 2 is a schematic perspective view which shows an indexable insert before use according to an embodiment of the present invention.

An indexable insert of the present invention includes a body, a base layer disposed on the body, and a wear-indicating layer disposed on a part of the base layer. FIG. 2 shows an indexable insert 1 which has a square upper surface. The indexable insert 1 includes a body 8. Preferably, the body 8 is made of, for example, a cemented carbide. For example, the body 8 may be made of sintered tungsten carbide or other cemented carbide materials. Furthermore, the body 8 may be made of a ceramic material.

As described above, as the material constituting the body, any of materials that are known to be used as a body (base) can be used without particular limitations. Examples thereof include cemented carbides (such as WC-based cemented carbides, and those containing, in addition to WC, Co, or further incorporated with a carbonitride of Ti, Ta, Nb, or the like), cermets (containing TiC, TiN, TiCN, or the like as a main component), high-speed steels, ceramics (titanium carbide, silicon carbide, silicon nitride, aluminum nitride, aluminum oxide, etc.), sintered cubic boron nitride compacts, sintered diamond compacts, sintered silicon nitride compacts, and mixtures of aluminum oxide and titanium carbide. Furthermore, the body (base) made of any of these material may be subjected to surface modification. For example, in the case of a cemented carbide, a β-free layer may be formed on the surface thereof. In the case of a cermet, a surface-hardening layer may be provided. Even if surface modification is performed as described above, the advantage of the present invention is exhibited.

Furthermore, the shape of the body 8 may be a polyhedron. The polyhedron may have at least a bottom surface, a plurality of side surfaces, and an upper surface, for example, as shown in FIG. 2. Examples of the polyhedron are not limited thereto and include polyhedrons of all shapes. At least one of the individual surfaces of the body 8 serves as a rake face, which will be described below, and at least one other surface serves as a flank face, the rake face being connected to the flank face with a cutting edge (represented as an edge where the rake face intersects with the flank face in FIG. 2) therebetween.

Examples of the indexable insert of the present invention include those provided with chip breakers and those not provided with chip breakers. Furthermore, in the indexable insert of the present invention, a through-hole 7 may be formed so as to penetrate from the upper surface to the bottom surface, the through-hole 7 being used as a fixing hole for fixing the indexable insert 1 on a tool. According to need, in addition to or in place of the fixing hole, another fixing means may be provided.

Such an indexable insert of the present invention is particularly useful as a indexable insert for drilling, end milling, milling, or turning, or as an insert for metal-slitting saw machining, gear-cutting tool machining, reamer machining, tap machining, crankshaft pin milling, or the like. Furthermore, the present invention is effective for each of a negative-type indexable insert and a positive-type indexable insert.

<Rake Face, Flank Face, and Cutting Edge>

In the body 8, at least one surface thereof serves as the rake face 2, at least one other surface thereof serves as the flank face 3, and the rake face 2 is connected to the flank face 3 with the cutting edge 4 (corresponding to an edge where the rake face intersects with the flank face) therebetween. Such an indexable insert 1 preferably has a plurality of cutting edges 4 as shown in FIG. 2. The reason for this is that it is possible to reduce the time and effort of replacing the indexable insert itself after one cutting edge has been used. Note that the expressions "rake face", "flank face", and "cutting edge" used in the present application are concepts that include not only portions and surfaces located at uppermost surfaces of the indexable insert but also surfaces of the body, surfaces of the individual layers, such as the wear-indicating layer, and corresponding portions located inside.

The cutting edge 4 constitutes a main point of action for cutting a workpiece. In FIG. 2, etc. the cutting edge 4 is linear, but the shape is not limited thereto. The cutting edge 4 may be circular, wavy, curved, or bent. Such a cutting edge may be subjected to processing, such as chamfering and/or corner rounding (R). When the cutting edge does not constitute a clear edge because of such edge processing or the like, assuming the state before the rake face and flank face are subjected to the edge processing or the like, each of the rake face and the flank face is geometrically extended and an edge at which both the extended rake face and the extended flank face intersect with each other is determined as a hypothetical edge, which is considered as a cutting edge.

In FIG. 2, the rake face 2 is shown as a flat surface, but according to need, the rake face may have other structures, such as chip breakers. The same applies to the flank face 3. Furthermore, although the flank face 3 is shown as a flat surface in FIG. 2, according to need, the flank face 3 may be chamfered (to be divided into a plurality of surface sections), formed into a different shape from the flat surface or a curved surface by other methods, or provided with chip breakers.

According to need, the cutting edge 4 may be formed into a curved or bent shape which is different from a linear shape. Furthermore, as is obvious from FIG. 5, for example, the cutting edge may be subjected to processing, such as chamfering and/or corner rounding (R) as described above.

<Base Layer>

Figure 5:
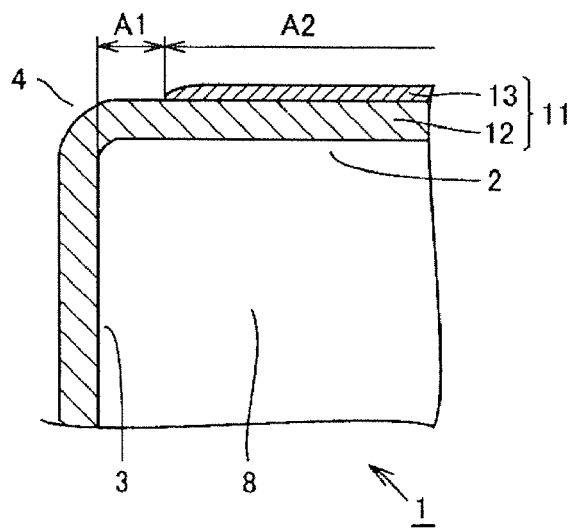
FIG. 5 is an enlarged sectional view of a cutting edge area of an indexable insert.

The base layer 12 disposed on the body 8 has a color different from that of the wear-indicating layer 13, which will be described below. FIG. 5 shows a structure of a coating 11 applied to the indexable insert 1. The coating 11 includes the base layer 12 extending over the rake face 2 and the flank face 3. As described above, the base layer 12 is disposed on the surface of the body 8. Such a base layer 12 may be formed at least on the flank face 3 and may be formed on both the rake face 2 and the flank face 3. Particularly preferably, the base layer 12 is formed over the entire surface of the body 8.

More specifically, the base layer 12 is exposed to the surface in the region where the wear-indicating layer 13 is not disposed thereon. In other words, in the region where the wear-indicating layer 13 is not disposed, the base layer 12 constitutes the surface.

Preferably, at least one layer constituting the base layer 12 has compressive residual stress in at least a part of an area in which the wear-indicating layer 13 is not disposed (i.e., the area constituting the surface) and which participates in cutting. By employing such a structure, toughness is imparted, and fracturing of the edge can be prevented very effectively. Here, the area which participates in cutting varies depending on the shape of the indexable insert, the type and size of workpiece, machining mode, and the like, but usually means a region extending from the cutting edge with which the workpiece is brought into contact (or to which the workpiece comes closest) at a width of 3 mm to each of the rake face side and the flank face side. The compressive residual stress is imparted to at least a part of the area which participates in cutting, and may be imparted to either one of the rake face side or the flank face side, or imparted to both sides.

The reason for specifying at least a part of the area which participates in cutting is that although compressive residual stress is preferably imparted entirely to such an area, it is intended to cover the case in which compressive residual stress is not imparted to a part of such an area due to various circumstances.

The term "compressive residual stress" is defined as a type of internal stress (inherent distortion) present in the coating (coating layer) and is a stress represented by a minus ("−") numerical value (units: "GPa" in the present invention). Consequently, the concept that the compressive residual stress is large means that the absolute value of the numerical value is large, and the concept that the compressive residual stress is small means that the absolute value of the numerical value is small. Incidentally, the term "tensile residual stress" is defined as a type of internal stress (inherent distortion) present in the coating layer and is a stress represented by a plus ("+") numerical value. Note that when stress is simply referred to as "residual stress", the term includes both compressive residual stress and tensile residual stress.

The absolute value of the compressive residual stress of the base layer 12 is preferably 0.1 GPa or more, more preferably 0.2 GPa or more, and still more preferably 0.5 GPa or more. If the absolute value is less than 0.1 GPa, it may not be possible to obtain sufficient toughness in some cases. Although a larger absolute value is more preferable in view of imparting toughness, if the absolute value exceeds 8 GPa, the coating layer itself may be separated, which is not very desirable.

Preferably, at least one layer constituting the base layer in the region specified above has such compressive residual stress. More preferably, at least the layer constituting the outermost layer of the base layer has such compressive residual stress. The reason for this is that it is believed that this contributes most to improvement in resistance to fracture.

The residual stress may be measured by any method. For example, the residual stress can be measured by a $\sin^2 \psi$ technique using an X-ray stress measurement device. Such residual stress can be measured by a method in which stress is measured at any 10 points (which are preferably selected so as to be 0.1 mm or more apart from each other so that the stress of the region of the layer can be represented appropriately) included in the region to which stress is imparted in the base layer using the $\sin^2 \psi$ technique, and the average value thereof is calculated.

Such a $\sin^2 \psi$ technique using X-rays has been widely used as the method for measuring the residual stress in polycrystalline materials. For example, the method which is described in detail on pages 54 to 66 in "X-ray Stress Measurement Method" (The Society of Materials Science, Japan, 1981, published by Yokendo Ltd.) may be used.

Furthermore, the residual stress can also be measured by a method using Raman spectroscopy. Such Raman spectroscopy is advantageous because it can carry out a local measurement of a narrow range, such as a spot diameter of 1 μm. The measurement of residual stress using Raman spectroscopy is commonly carried out. For example, the method described on pages 264 to 271 in "Hakumaku no rikigakuteki tokusei hyoka gijutsu (Techniques for evaluating dynamic properties of thin films)" (Sipec, published in 1992) can be employed.

Furthermore, the residual stress can also be measured using radiation. Such a method is advantageous in that it is possible to obtain a residual stress distribution in the thickness direction of the base layer (coating layer).

The base layer 12 may be formed by a known chemical vapor deposition (CVD) method, a physical vapor deposition (PVD) method, a sputtering method, or the like, and the formation method is not particularly limited. For example, when the indexable insert 1 is used for a drill or an end mill, the base layer is preferably formed by a PVD method capable of forming a layer without decreasing transverse rupture strength. Furthermore, the thickness of the base layer is preferably controlled by adjusting the deposition time.

When the base layer is formed using a known CVD method, preferably, a layer formed by a medium-temperature CVD (MT-CVD) method is provided. In particular, it is most suitable to provide a titanium carbonitride (TiCN) layer formed by this method, the layer having excellent wear resistance. In the conventional CVD method, film deposition is performed at about 1,020° C. to 1,030° C. In contrast, in the MT-CVD method, film deposition can be performed at a relatively low temperature of about 850° C. to 950° C. Thus, it is possible to reduce the damage of the body due to heating during film deposition. Consequently, the layer formed by the MT-CVD method is preferably provided in close proximity to the body. Furthermore, as the gas used for film deposition, use of a nitrile gas, in particular, acetonitrile ($CH_3CN$), is preferable in view of high mass productivity. By using a multilayer structure in which a layer formed by the MT-CVD method and a layer formed by a high-temperature CVD (HT-CVD) method (i.e., the conventional CVD method) are stacked on each other, adhesion between the coating layers may be improved, which is preferable in some cases.

Meanwhile, the method for imparting the compressive residual stress to the base layer 12 is not particularly limited. For example, when the base layer 12 is formed by CVD, after the formation of the base layer, blasting is performed on a region of the base layer to which compressive residual stress is to be imparted. Thereby, compressive residual stress can be imparted. Furthermore, blasting may be performed on a wider region than the region described above (at least a part of the area in which the wear-indicating layer 13 is not disposed (i.e., the region serving as the surface) and which participates in cutting). On the other hand, when the base layer 12 is formed by PVD, since compressive residual stress is imparted during the formation, it is not necessary to perform the treatment described above.

As described above, as the method for imparting compressive residual stress to the base layer 12, a method in which the base layer 12 itself is formed by PVD may be mentioned. However, in view of adhesion between the base layer 12 and the body 8, preferably, the base layer 12 itself is formed by CVD and compressive residual stress is imparted thereto by blasting.

Such blasting can be performed after the base layer 12 is formed. Alternatively, a method may be used in which the wear-indicating layer 13 that will be described below is formed over the entire surface of the base layer 12, and then blasting is performed on a region other than the region in which the wear-indicating layer 13 is allowed to remain. In such a case, the operation of removing the wear-indicating layer 13 is carried out at the same time. By using such a method, the production efficiency of the indexable insert is improved, which is preferable. In such a case, the region in which the wear-indicating layer 13 is allowed to remain is preferably masked with a jig or the like.

The blasting described above is a type of surface treatment for removing a coating, rust, dirt, and the like on the surface of a workpiece by any of the processes (1) to (3) or the like, which is used in many industrial fields.
(1) Particles of any of various abrasives are sprayed to the surface of a workpiece using compressed air.
(2) Particles of any of various abrasives are continuously projected to the surface of a workpiece using a rotary wing.
(3) A liquid (water) containing particles of any of various abrasives is sprayed to the surface of a workpiece under high pressure.

Examples of type of particles of the various abrasives, which are commonly used, include steel grids, steel shots, cut wires, alumina, glass beads, and silica sand. The process may be referred to as sandblasting, shotblasting, alumina blasting, or glass bead blasting according to the type of particles.

For example, sandblasting is a process of spraying abrasive particles of silica sand (powder) or the like by means of compressed air or the like to the surface of a workpiece. Shotblasting is a process which uses steel shots (usually spherical). Furthermore, wet blasting is a process of spraying a liquid (water) containing abrasive particles under high pressure to the surface of a workpiece.

Specific conditions of such blasting vary depending on the type of abrasive particles (grains) used and the method of application. For example, conditions of metal abrasives for blasting are regulated in JIS Z0311:1996, and conditions of non-metal abrasives for blasting are regulated in JIS Z0312: 1996. Furthermore, conditions of shotblasting are regulated in detail in JIS B6614:1998. In the blasting treatment of the present invention, any of these conditions can be employed.

As the method for imparting compressive residual stress to the base layer 12, in addition to use of the blasting treatment described above, brushing, shot-peening, barrel processing, ion implantation, or the like may be used.

On the other hand, the base layer 12 may have a multilayered structure formed by stacking a plurality of layers, and preferably, the base layer 12 exhibits a function as a wear-resistant layer. The base layer 12 can be made of a compound including at least one element selected from the group consisting of Group IVa elements, Group Va elements, and Group VIa elements in the periodic table, Al, and Si, and at least one element selected from the group consisting of carbon, nitrogen, oxygen, and boron, and thereby, excellent performance is provided.

For example, the base layer 12 may be or contain an $Al_2O_3$ layer as such a compound. A structure may be possible in which a TiN layer is formed first on the body 8, a TiCN layer is formed thereon, and an $Al_2O_3$ layer is formed further thereon. Such a three-layer system as a whole constitutes the base layer 12 and exhibits a function as a wear-resistant layer.

When the base layer 12 has the multilayered structure formed by stacking a plurality of layers as described above, particularly preferably, the outermost layer is an $Al_2O_3$ layer or a layer containing $Al_2O_3$. The reason for this is that the $Al_2O_3$ layer or the layer containing $Al_2O_3$ is excellent as a wear-resistant layer and has a blackish color (which may be expressed simply as black in the present application although, exactly speaking, the layer itself does not assume a black color and is easily influenced by the color of the underlying layer), particularly high contrast can be obtained with respect to the wear-indicating layer which is disposed thereon.

Particularly preferably, the $Al_2O_3$ layer or the layer containing $Al_2O_3$ is exposed to the surface at least at a part of an area in which the wear-indicating layer 13 is not disposed and which participates in cutting and has compressive residual stress in the region. Thereby, it is possible to allow the part that is most related to resistance to fracture to have both wear resistance and toughness satisfactorily. In this respect, more preferably, the area which participates in cutting entirely has compressive residual stress. The absolute value of the compressive residual stress is preferably 0.1 GPa or more, more preferably 0.2 GPa or more, and still more preferably 0.5 GPa or more. Although a larger absolute value is more preferable in view of imparting toughness, if the absolute value exceeds 8 GPa, the layer itself may be separated, which is not very desirable. With respect to $Al_2O_3$ constituting the $Al_2O_3$ layer or the layer containing $Al_2O_3$, the crystal structure is not particularly limited. Examples of the $Al_2O_3$ include $\alpha$-$Al_2O_3$, $\kappa Al_2O_3$, $\gamma$-$Al_2O_3$, amorphous $Al_2O_3$, and mixtures of these. The layer containing $Al_2O_3$ is defined as a layer which contains at least $Al_2O_3$ (at a content of 50% by mass or more) as a part thereof, and the balance may include other compounds constituting the base layer, $ZrO_2$, $Y_2O_3$ (which may be considered that Zr or Y is added to alumina), and the like. The $Al_2O_3$ may also contain chlorine, carbon, boron, nitrogen, and the like.

Specific examples of the compound constituting the base layer 12, which can be used instead of (or together with) the $Al_2O_3$, include TiCN, TiN, TiCNO, TiBN, $ZrO_2$, and AlN. In a preferred example, as the base layer 12, first, a TiN layer with a thickness of several micrometers is formed over the entire surface of the body 8, a TiCN layer with a thickness of several micrometers is formed thereon, and an $Al_2O_3$ layer (or a layer containing $Al_2O_3$) with a thickness of several micrometers is formed further thereon. Such a structure exhibits a function as a wear-resistant layer.

In a further preferred example, as an underlying layer for the $Al_2O_3$ layer or the layer containing $Al_2O_3$, a layer composed of a compound including Ti and at least one element selected from the group consisting of nitrogen, oxygen, and boron is formed. By employing such a structure, particularly excellent adhesion can be obtained between the $Al_2O_3$ layer or the layer containing $Al_2O_3$ and the underlying layer, and excellent wear resistance can also be obtained. Specific examples of such a compound include TiN, TiBN, TiBNO, TiCBN, and TiCNO. Other preferred examples of the compound include AlON and AlCNO.

By using a wear-resistant layer as the base layer 12 as described above, the tool life of the indexable insert can be dramatically increased. In addition, such a structure is advantageous in that it provides durability under a severer operating environment, such as an increased cutting speed. By forming the wear-resistant layer at least on the flank face or both on the flank face and on the rake face, this advantage is more effectively accomplished.

The base layer 12 may have a structure in which, partially or entirely at the cutting edge 4 that participates in cutting, a layer other than the $Al_2O_3$ layer or the layer containing $Al_2O_3$, which is the outermost layer, is exposed to the surface. By using such a structure, higher adhesion resistance to the workpiece can be exhibited, which is advantageous. In order to produce such a structure, preferably, an $Al_2O_3$ layer or a layer containing $Al_2O_3$ is formed over the entire surface as the outermost layer of the base layer, and then, partially or entirely at the cutting edge 4 that participates in cutting, the $Al_2O_3$ layer or the layer containing $Al_2O_3$ is removed so that the layer other than the $Al_2O_3$ layer or the layer containing $Al_2O_3$ (i.e., the layer serving as an underlying layer with respect to the $Al_2O_3$ layer or the layer containing $Al_2O_3$) is exposed to the surface. In such a case, as the method for removing the $Al_2O_3$ layer or the layer containing $Al_2O_3$, the same method as that used for removing the wear-indicating layer 13 described above may be employed.

Herein, the cutting edge that participates in cutting is a concept that includes a cutting edge with (or to) which a workpiece is actually brought into contact (or in close proximity), and also includes a case in which a workpiece is brought into contact with the vicinity of a cutting edge, and the cutting edge substantially participates in cutting (e.g., the temperature increases). However, a cutting edge to which chips of a workpiece during machining are brought into contact due to flying is not included in the concept.

Preferably, the base layer 12 has a thickness of 0.05 to 20 μm. If the thickness is less than 0.05 μm, improvement in wear resistance is not achieved. Even if the thickness exceeds 20 μm, significant improvement in wear resistance is not observed, which is not economically advantageous. Nevertheless, if this low economic efficiency is ignored, the thickness may be 20 μm or more, and the advantage of the present invention is exhibited. In order to measure the thickness, for example, a method may be used in which an indexable insert is cut and a section is observed using a scanning electron microscope (SEM).

<Wear-Indicating Layer>

The wear-indicating layer of the present invention is characterized in that, for example, as shown in FIGS. 2 and 5, it is disposed on the rake face and on the base layer entirely or partially in a region A2 other than a region A1 that extends to a distance of 0.2 mm or more and less than 4.0 mm from the cutting edge (vertical distance with respect to the cutting edge). As a result of the study of the present inventor, it has been found that even on the rake face 2, in the region A1 that extends to a distance of 0.2 mm or more and less than 4.0 mm from the cutting edge 4, significant welding of a workpiece material occurs. In the present invention, by forming the wear-indicating layer selectively on the rake face and entirely or partially in the region A2 other than the region A1, welding of the workpiece material can be effectively prevented. Consequently, a significant advantage is obtained in which, while the appearance and surface smoothness of a workpiece after machining are prevented from welding of work piece, an alerting function is provided in an easily visible state.

If the distance from the cutting edge is less than 0.2 mm, since welding of the workpiece material occurs, the significant advantage described above is not obtained. If the distance exceeds 4.0 mm, although depending on cutting conditions, etc., the color change effect of the wear-indicating layer due to cutting may not be exhibited sufficiently in some cases.

When the thickness of the indexable insert is in the range of 2 to 8 mm, the lower limit of the distance is preferably 0.3 mm or more, and more preferably 0.5 mm or more. When the thickness of the indexable insert is in the range of 2 to 8 mm, the upper limit of the distance is preferably less than 2.5 mm, and more preferably less than 2.0 mm. Preferably, the distance is appropriately selected within the ranges described above according to the size of the indexable insert. In such a manner, the wear-indicating layer is formed preferably in at least 20% or more, more preferably in 50% or more, and still more preferably in 80% or more of the region of the rake face. Thereby, it is possible to provide a satisfactory alerting function while preventing the welding of the workpiece material.

For example, as shown in FIG. 5, a coating 11 has a wear-indicating layer 13 which is disposed on a rake face 2 and on the base layer 12 entirely or partially in a region A2 other than a region A1 that extends to a distance of 0.2 mm or more and less than 4.0 mm from the cutting edge. Such a wear-indicating layer 13 can be formed by known chemical vapor deposition, physical vapor deposition, vacuum deposition, plating, or sputtering, and the formation method is not particularly limited.

The reason for specifying "entirely or partially in the region A2" is that, in the case where only a part of the cutting edge participates in cutting, the alerting function can be achieved by disposing the wear-indicating layer only on an area adjacent to the part participating in cutting, it is not always necessary to dispose a large wear-indicating layer so as to cover the region A2 entirely. Consequently, the wear-indicating layer 13 may be disposed entirely in the region A2 or may be disposed partially in the region A2.

Furthermore, the distance of 0.2 mm or more and less than 4.0 mm corresponds to an average value in the area which participates in cutting. The reason for this is that, in the industrial production, it is difficult to maintain a constant value for the distance (i.e., to set the distance to be accurately the same vale at any part of the region A1 or to form the region A1 completely parallel to the cutting edge). The average value is a value calculated by selecting any part in the region and by dividing the area per a unit length of the part (1 mm parallel to the cutting edge) by the unit length.

Furthermore, with respect to the boundary between the section where the wear-indicating layer is disposed (the region A2) and the section where the wear-indicating layer is not disposed (the region A1), the vicinity of the boundary is observed with an electron microscope and/or a metallurgical microscope, and when the area of the wear-indicating layer occupying the unit area (100 μm×100 μm) is 80% or more, it is considered that the wear-indicating layer is disposed.

The wear-indicating layer may be disposed on the rake face and further in the region A1. The reason for this is that even if the wear-indicating layer is partially disposed in the region A1 except for the area which participates in cutting (i.e., the area where welding of the workpiece material occurs significantly), the appearance of the workpiece, etc. are not considered to be impaired. Furthermore, depending on the type of workpiece, in some cases, even if the wear-indicating layer is disposed partially in the area which participates in cutting, no significant welding phenomenon occurs and a clear alerting function is exhibited.

According to the embodiment of the present invention, the wear-indicating layer 13 is a titanium nitride layer having a yellow or brass (gold) appearance. In contrast, the base layer 12, which is the underlying layer of the wear-indicating layer has a black or blackish color resulting from $Al_2O_3$ (the outermost layer in the base layer). Preferably, the wear-indicating layer 13 is a layer that is more susceptible to wear than the base layer 12. The reason for this is that the wear-indicating layer 13 is easily removed during cutting to expose the base layer 12, which is the underlying layer, and thus, use of that part can be easily indicated. Furthermore, by removing the wear-indicating layer disposed other than in the region A2, the production of the indexable insert itself is also facilitated.

As described above, the wear-indicating layer 13 has a color different from that of the base layer 12, and by disposing the wear-indicating layer 13 on the specific part, a part of the rake face has high chromatic contrast with the flank face. The reason for this is that, as described above, the base layer 12 serving as the wear-resistant layer is usually disposed on the surface of the flank face.

The wear-indicating layer 13 is disposed on the rake face 2 and on the base layer 12 entirely or partially in the region A2 other than the region A1 that extends to a distance of 0.2 mm or more and less than 4.0 mm from the cutting edge 4. Consequently, during cutting, the material constituting the wear-indicating layer 13 is prevented from being welded on the workpiece to impair the appearance and surface smoothness of the workpiece. Thus, an alerting function can be exhibited without such a demerit. The wear-indicating layer 13 may be composed of a single layer or formed by stacking a plurality of layers.

Such a wear-indicating layer 13 is made of at least one metal (element) selected from the group consisting of Group IVa elements, Group Va elements, and Group VIa elements in the periodic table, Al, Si, Cu, Pt, Au, Ag, Pd, Fe, Co, and Ni, or an alloy containing the metal, or is made of a compound containing at least one element selected from the group consisting of Group IVa elements, Group Va elements, and Group VIa elements in the periodic table, Al, and Si, and at least one element selected from the group consisting of carbon, nitrogen, oxygen, and boron. Any of these materials has a vivid color and can be easily produced industrially, and thus is preferable for use. In particular, when two or more layers are stacked, preferably, the outermost layer has the structure described above.

More preferably, the outermost layer of the wear-indicating layer is made of at least one metal selected from the group consisting of Group IVa elements, Group Va elements, and Group VIa elements in the periodic table, Al, Si, Cu, Pt, Au, Ag, Pd, Fe, Co, and Ni, or is made of a compound containing at least one element selected from the group consisting of Group IVa elements, Group Va elements, and Group Via elements in the periodic table, Al, and Si, and at least one element selected from the group consisting of carbon, nitrogen, oxygen, and boron. The reason for this is that the compound has a particularly vivid color, such as yellow, pink, brass, or gold, is excellent in design properties, and can produce a clear contrast with the base layer. When the wear-indicating layer is composed of only one layer, this layer corresponds to the outermost layer.

More specifically, the wear-indicating layer may be made of, in addition to TiN described above, for example, an element or a compound, such as ZrN, TiCN, TiSiCN, TiCNO, VN, or Cr.

The wear-indicating layer 13 does not have a strong function of improving wear resistance (i.e., preferably, the wear-indicating layer 13 is susceptible to wear and has inferior wear resistance to the base layer) and has a relatively small thickness. The wear-indicating layer 13 has a thickness of preferably 0.05 to 2 μm, and more preferably 0.1 to 0.5 μm. If the thickness is less than 0.05 μm, it becomes difficult to industrially perform coating uniformly on a predetermined part, and thus, color irregularities may occur in the appearance, resulting in impairment to the appearance. Even if the thickness exceeds 2 μm, a significant difference is not observed as the wear-indicating layer, which is rather economically disadvantageous. As the method for measuring the thickness, the same measuring method as that for the base layer can be employed.

Furthermore, the wear-indicating layer 13 may have compressive residual stress. This can contribute to improvement of toughness of the indexable insert. The absolute value of the compressive residual stress is preferably 0.1 GPa or more, more preferably 0.2 GPa or more, and still more preferably 0.5 GPa or more. If the absolute value is less than 0.1 GPa, it may not be possible to obtain sufficient toughness in some cases. Although a larger absolute value is more preferable in view of imparting toughness, if the absolute value exceeds 8 GPa, the wear-indicating layer itself may be separated, which is not very desirable.

<Surface Roughness Ra>

Particularly preferably, the region A1 is smoothed in order to prevent the welding of the workpiece material. The surface smoothness can be obtained by subjecting the surface of the region A1 to a mechanical treatment, such as brushing or blasting (sandblasting). Such a mechanical treatment is usually performed to remove the wear-indicating layer disposed on the base layer, and it is also possible to perform the mechanical treatment on the surface of the region A1 as an independent treatment. The smoothness can be obtained not only by the mechanical treatment but also, for example, by a chemical treatment or a physical treatment.

According to the study of the present inventor, particularly good resistance to welding of workpiece material is obtained when the relationship 1.0>A/B is satisfied, wherein A (μm) represents the surface roughness Ra of the region A1, and B (μm) represents the surface roughness Ra of the region A2. More preferably, 0.8>A/B, and still more preferably 0.6>A/B.

The surface roughness Ra is a type of value that indicates surface roughness and is referred to as a center line average (JIS B0601). The measurement method thereof is not particularly limited, and any known measurement can be employed. For example, a contact method (e.g., a stylus method) or a non-contact method (e.g., a laser microscope method) may be used. Alternatively, a method may be used in which a cross section of the indexable insert is directly observed with a microscope.

<Method for Producing Indexable Insert>

In a method for producing an indexable insert according to the present invention, the indexable insert including a body, a base layer disposed on the body, and a wear-indicating layer disposed on a part of the base layer, the method includes a step of forming the base layer on the body, a step of forming the wear-indicating layer on the base layer, the wear-indicating layer having a color different from that of the base layer, and a step of removing the wear-indicating layer formed in a region located on a rake face of the body and including at least a region A1 which extends to a distance of 0.2 mm or more and less than 4.0 mm from a cutting edge and formed on a flank face of the body. Thereby, it is possible to produce the indexable insert with significantly high production efficiency.

As described above, in the production of the indexable insert 1, the wear-indicating layer 13 is formed on the base layer 12, and then the wear-indicating layer 13 is removed from the region A1 which is located on the rake face 2 and which extends to a distance of 0.2 mm or more and less than 4.0 mm from the cutting edge 4 and from the flank face 3. Thereby, it is possible to produce an indexable insert which has the high chromatic contrast between a part of the rake face and the flank face as described above.

As described above, as the method for removing the wear-indicating layer 13, any of a chemical method, a physical method, and a mechanical method may be used. Preferably, brushing or any of other abrasive methods, for example, a physical or mechanical method, such as removal by sandblasting (blasting) may be employed. In addition, as described above, such blasting also has an effect of smoothing the re-exposed surface of the base layer 12.

Furthermore, the method for producing the indexable insert according to the present invention may include a step of performing a smoothing treatment on the region A1 (which includes a case where smoothing is performed simultaneously with the step of removing the wear-indicating layer). Preferably, such a smoothing treatment is performed so that the relationship 10.0>A/B is satisfied, wherein A (μm) represents the surface roughness Ra of the region A1, and B (μm) represents the surface roughness Ra of the region A2. Thereby, the appearance and surface smoothness of the workpiece after machining can be guaranteed.

As the smoothing treatment, any of a chemical method, a physical method, and a mechanical method may be used. Preferably, brushing or any of other abrasive methods, for example, a physical or mechanical method, such as polishing by sandblasting (blasting) may be employed.

<Operations, Etc.>

The indexable insert 1 has the rake face 2 which is intact in the unused state as described in FIG. 2. In particular, the entirety or a part of the surface of the region A2 other than the region A1 that extends to a distance of 0.2 mm or more and less than 4.0 mm from the cutting edge 4 on the rake face 2 still has the color of the original wear-indicating layer 13, thereby indicating that the cutting edge 4 has not been used. For example, when the region A2 is entirely or partially coated with TiN, the wear-indicating layer 13 in the region A2 has a bright brass color (gold) in the unused state. In contrast, each of the region A1 and the flank face 3 is made of $Al_2O_3$, which is the base layer 12, has relatively blackish or substantially black appearance, which represents the indexable insert.

The following description will be made assuming that the indexable insert 1 is fixed on a tool body of a cutting tool, and any one of a plurality of cutting edges 4 is used first. When the cutting tool is used, the one cutting edge 4 is immediately brought into contact with a workpiece 5 to start cutting the workpiece 5. In particular, in the cutting edge 4 and the flank face 3, the wear of the indexable insert 1 is low due to the presence of the base layer 12.

However, when cutting by the cutting edge 4 is started, the wear-indicating layer 13 in a section adjacent to the cutting edge 4 (the region A2 other than the region A1 which extends to a distance of 0.2 mm or more and less than 4.0 mm from the cutting edge on the rake face 2) changes color, and a relatively large initial change occurs in the region A2 in the rake face 2. The discolored section has a color different from that of the wear-indicating layer 13, and in some cases, the base layer 12, which is far more blackish, may be observed.

Figure 3:
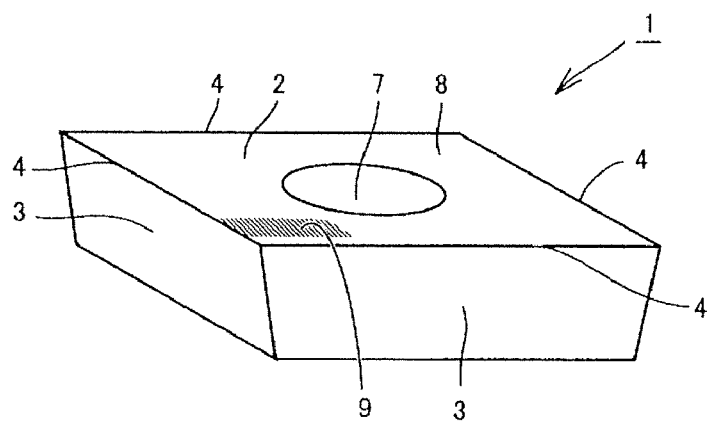
FIG. 3 is a schematic perspective view which shows an indexable insert after one cutting edge has been used according to the present invention.

Consequently, as shown in FIG. 3, a discolored section 9 which extends from the cutting edge 4 and which is discolored to a blackish color occurs. The discolored section 9 is immediately and easily identified, and the alerting function is exhibited. In addition to the change in color because the base layer 12 is exposed as described above, the change in color may be caused due to heat, for example, by an oxidation phenomenon.

For example, as shown in FIG. 3, the wear-indicating layer 13 in a section adjacent to the cutting edge 4 (the region A2 other than the region A1 which extends to a distance of 0.2 mm or more and less than 4.0 mm from the cutting edge on the rake face 2) has a temper color, and thus a discolored section 9 is formed therein. This change originates from an increase in temperature in the vicinity of the cutting edge as a result of cutting of the workpiece by the cutting edge 4.

Figure 4:
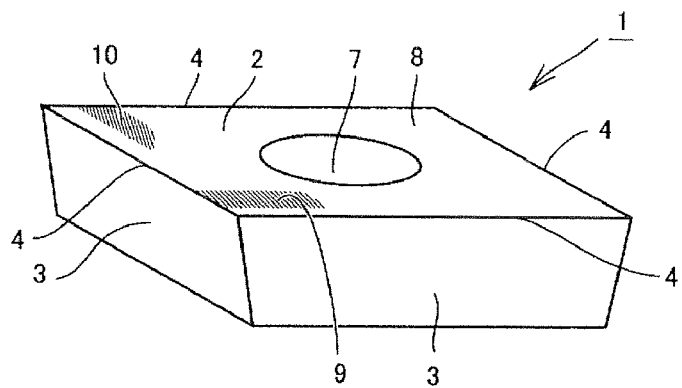
FIG. 4 is a schematic perspective view which shows an indexable insert after two cutting edges have been used according to the present invention.

After the indexable insert 1 has been used for a long period of time (after the cutting position has been changed), the rake face 2 assumes an appearance shown in FIG. 4. Since the appearance shown in FIG. 3 is reached after only several minutes of the cutting operation, for example, the operating personnel can determine at a glance that one cutting edge 4 has already been used while the other cutting edge 4 is still completely unused. If the other cutting edge 4 is used for the first time, the rake face 2 assumes the appearance shown in FIG. 4. In such a case, the wear-indicating layer 13 in a section adjacent to the other cutting edge 4 (the region A2 other than the region A1 which extends to a distance of 0.2 mm or more and less than 4.0 mm from the cutting edge on the rake face 2) changes color, and a discolored section 10 occurs, thus indicating that the other cutting edge 4 has been used.

The indexable insert 1 shown in each of FIGS. 2 to 4 is an indexable insert provided with four usable cutting edges 4. It is possible to identify at a glance which has already been used or which has not been used among the plurality of cutting edges 4 by means of the color of the wear-indicating layer 13. Consequently, a cutting tool provided with such an indexable insert can be maintained particularly simply.

As described above, a composite coating 11 including the base layer 12 and the wear-indicating layer 13 is disposed on the indexable insert 1 (FIG. 5). Note that the wear-indicating layer is disposed on a specific part of a single rake face or a plurality of rake faces. For example, in a commonly used indexable insert, such as SNGN120408 (ISO standard), an upper face or a bottom face serves as a rake face, and in an exceptional indexable insert referred to as "tangential" or the like, other than the former one, a side face serves as a rake face.

In the wear-indicating layer 13, if the adjacent cutting edge 4 is used even for a short period of time, a clear trace remains, and the wear-indicating layer 13 changes color or is altered. As described above, since the wear-indicating layer 13 is very sensitive, in some cases, a layer or a material disposed thereunder of a different color (i.e., the base layer) may be seen. In such a manner, by the action of the wear-indicating layer 13, a clear chromatic contrast or brightness contrast occurs, and the used cutting edge can be immediately identified. By disposing the coating, which may be disadvantageous in terms of abrasion, in the specific part of the rake face (the region A2 other than the region A1 that extends to a distance of 0.2 mm or more and less than 4.0 mm from the cutting edge), the appearance and surface smoothness of the workpiece are less impaired than the case in which the coating is disposed on the flank face or in the region A1. Therefore, it has been found that use of the region A2 as a wear-indicating surface is particularly advantageous. In addition, since the wear-indicating layer is disposed on the rake face side, it is possible to easily identify which cutting edge has been used even when the indexable insert is placed in a storage case or placed on a working table, which is an excellent function.

EXAMPLES

While the present invention will be described in more detail by way of examples, it is to be understood that the present invention is not limited thereto.

Example 1

A cemented carbide powder having a composition including 89.5% by mass of WC, 2.0% by mass of TaC, 0.5% by mass of NbC, and 8.0% by mass of Co was pressed. Subsequently, the resulting compact was sintered in a vacuum atmosphere at 1,400° C. for 1 hour, and then subjected to planarization polishing. A cutting edge part was subjected to cutting-edge treatment (honing with a width of 0.05 mm on the rake face side). Thereby, an insert made of a cemented carbide having the same shape as that of a cutting insert CNMG120408N-GU (manufactured by Sumitomo Electric Hardmetal Corp.) was obtained and used as a body. In the body, a beta-free layer with a thickness of 15 μm was disposed on the surface thereof, two surfaces each served as a rake face, and four surfaces each served as a flank face, each rake face being connected to each flank face with a cutting edge (which was a hypothetical edge because of the cutting-edge treatment performed as described above) therebetween. Total eight cutting edges were present.

The following layers were formed from the bottom in that order by a known thermal CVD method over the entire surface of the body. That is, a TiN layer with a thickness of 0.6 μm, a TiCN layer (MT-CVD) with a thickness of 4.6 μm, an α-alumina ($Al_2O_3$) layer with a thickness of 2.1 μm, and a TiN layer as an outermost layer with a thickness of 0.6 μm were formed by coating in that order on the surface of the body (total thickness 7.9 μm). In this coating (coating No. 1), the TiN layer with a thickness of 0.6 μm (on the body surface side), the TiCN layer with a thickness of 4.6 μm, and the α-alumina ($Al_2O_3$) layer with a thickness of 2.1 μm constituted a base layer, and the TiN layer with a thickness of 0.6 μm as the outermost layer constituted a wear-indicating layer.

In place of the coating No. 1, coatings Nos. 2 to 6 shown in Table I below were each formed over the entire surface of a corresponding body in the same manner.

TABLE I

| | | Coating | |
|---|---|---|---|
| No. | Base layer | Wear-indicating layer | Total thickness |
| 1 | TiN(0.6 μm)/TiCN(MT-CVD, 4.6 μm)/α-$Al_2O_3$(2.1 μm) | TiN(0.6 μm) | 7.9 μm |
| 2 | TiC(0.3 μm)/TiCN(MT-CVD, 2.6 μm)/κ-$Al_2O_3$(1.6 μm) | TiCN(0.5 μm) | 5.0 μm |
| 3 | TiN(0.5 μm)/TiCN(MT-CVD, 4.6 μm)/TiC(2.5 μm)/κ-$Al_2O_3$(1.8 μm) | TiN(0.5 μm) | 9.9 μm |
| 4 | TiN(0.4 μm)/ZrCN(3.7 μm)/$ZrO_2$(0.6 μm)/α-$Al_2O_3$(1.4 μm) | ZrN(0.5 μm) | 6.6 μm |
| 5 | TiN(0.3 μm)/TiCN(MT-CVD, 5.4 μm)/TiCN(HT-CVD, 1.0 μm)/TiBN(0.4 μm)/α-$Al_2O_3$(4.9 μm) | TiN(0.4 μm) | 12.4 μm |
| 6 | TiN(0.5 μm)/TiCN(MT-CVD, 4.7 μm)/α-$Al_2O_3$(1.6 μm) | CrN(0.4 μm) | 7.2 μm |

In Table I, in each base layer, the layers were deposited over the surface of the body in the order from the left to the right. The individual layers except for the CrN layer of the coating No. 6, were each formed by a known thermal CVD method. The CrN layer was formed by ion plating.

With respect to each of the bodies applied with the coatings, the following seven treatment processes A to G were performed using a known blasting technique. In each treatment process, a part in which the wear-indicating layer was to be left was masked with a jig.

(Treatment Process A)

The coating was not subjected to blasting. Consequently, the entire surface of the body had the color of the wear-indicating layer (for example, in the coating No. 1, gold, i.e., the color of TiN).

(Treatment Process B)

Figure 7:
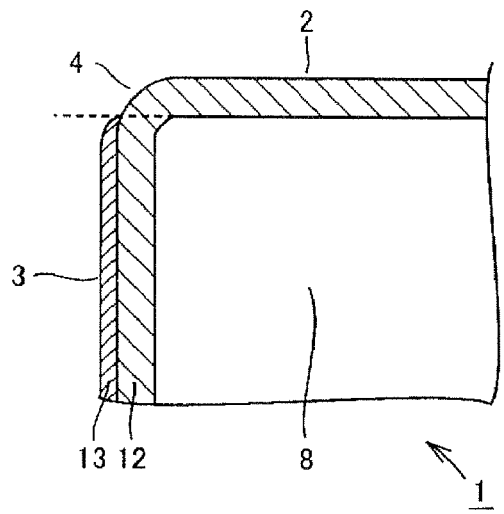
FIG. 7 is a sectional view of an indexable insert in which a wear-indicating layer is formed over the entire surface of a flank face.

With respect to the coating, the wear-indicating layer at the rake face was removed by blasting. Consequently, the entire surface of the flank face including the cutting edge had the color of the wear-indicating layer (for example, in the coating No. 1, gold, i.e., the color of TiN), and the rake face had the color of the base layer (for example, in the coating No. 1, black, i.e., the color of $Al_2O_3$) (refer to FIG. 7; although the wear-indicating layer 13 stops short of the rake face 2 without curving toward the rake face 2 in FIG. 7, this treatment process includes the case where the wear-indicating layer 13 curves toward the rake face 2).

(Treatment Process C)

Figure 6:
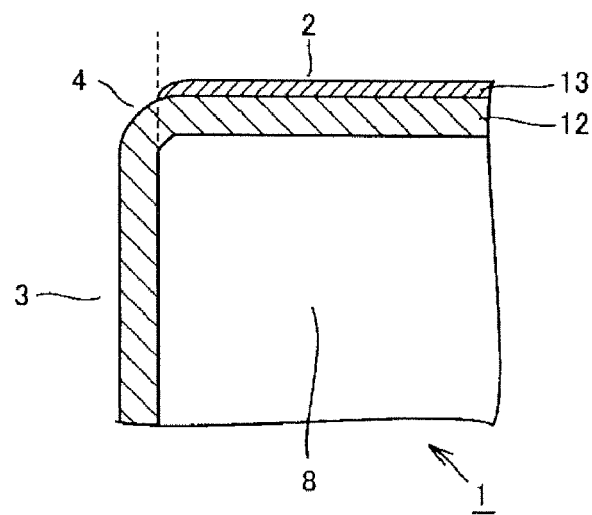
FIG. 6 is a sectional view of an indexable insert in which a wear-indicating layer is formed over the entire surface of a rake face.

With respect to the coating, the wear-indicating layer over the entire surface of the flank face including the cutting edge was removed by blasting. Consequently, the rake face had the color of the wear-indicating layer (for example, in the coating No. 1, gold, i.e., the color of TiN), and the entire surface of the flank face including the cutting edge had the color of the base layer (for example, in the coating No. 1, black, i.e., the color of $Al_2O_3$) (refer to FIG. 6; although the wear-indicating layer 13 stops short of the flank face 3 without curving toward the flank face 3 in FIG. 6, this treatment process includes the case where the wear-indicating layer 13 curves toward the flank face 3).

(Treatment Process D)

With respect to the coating, the wear-indicating layer formed over the entire surface of the flank face and formed on the rake face in a region A1 extending to a distance of 0.5 to 0.8 mm from the cutting edge was removed by blasting. Consequently, a region A2 lying on an area of the rake face other than that of the region A1 extending to a distance of 0.5 to 0.8 mm from the cutting edge had the color of the wear-indicating layer (for example, in the coating No. 1, gold, i.e., the color of TiN), and the region A1 lying on the rake face and extending to a distance of 0.5 to 0.8 mm from the cutting edge and the flank face (including the cutting edge) had the color of the base layer (for example, in the coating No. 1, black, i.e., the color of $Al_2O_3$) (refer FIG. 5). The distance of 0.5 to 0.8 mm is an average value. The reason for expressing the average value in such a range is that although masking was performed as accurately as possible, it was difficult to maintain the distance at a constant value due to overblasting or the like, and it was not possible to exclude a margin of error.

(Treatment Process E)

With respect to the coating, the wear-indicating layer formed over the entire surface of the flank face and formed on the rake face in a region A1 extending to a distance of 0.2 to 0.5 mm from the cutting edge was removed by blasting. Consequently, a region A2 lying on an area of the rake face other than that of the region A1 extending to a distance of 0.2 to 0.5 mm from the cutting edge had the color of the wear-indicating layer (for example, in the coating No. 1, gold, i.e., the color of TiN), and the region A1 lying on the rake face and extending to a distance of 0.2 to 0.5 mm from the cutting edge and the flank face (including the cutting edge) had the color of the base layer (for example, in the coating No. 1, black, i.e., the color of $Al_2O_3$). The distance was expressed in the range of 0.2 to 0.5 mm for the same reason as that in the treatment process D.

(Treatment Process F)

With respect to the coating, the wear-indicating layer formed over the entire surface of the flank face and formed on the rake face in a region A1 extending to a distance of 0.4 to 2.8 mm from the cutting edge was removed by blasting. Consequently, a region A2 lying on an area of the rake face other than that of the region A1 extending to a distance of 0.4 to 2.8 mm from the cutting edge had the color of the wear-indicating layer (for example, in the coating No. 1, gold, i.e., the color of TiN), and the region A1 lying on the rake face and extending to a distance of 0.4 to 2.8 mm from the cutting edge and the flank face (including the cutting edge) had the color of the base layer (for example, in the coating No. 1, black, i.e., the color of $Al_2O_3$). The distance was expressed in the range of 0.4 to 2.8 mm for the same reason as that in the treatment process D.

(Treatment Process G)

With respect to the coating, the wear-indicating layer formed over the entire surface of the body was removed by blasting. Consequently, the entire surface of the body (both the surface of the rake face and the surface of the flank face) had the color of the base layer (for example, in the coating No. 1, black, i.e., the color of $Al_2O_3$).

In such a manner, 42 indexable inserts Nos. 1 to 42 shown in Tables II and III were produced. Cutting inserts Nos. 4, 5, 6, 11, 12, 13, 18, 19, 20, 25, 26, 27, 32, 33, 34, 39, 40, and 41 are examples of the present invention, and the other cutting inserts are comparative examples.

With respect to the indexable inserts Nos. 1 to 42, a turning test was performed under the following conditions, and the surface roughness of the workpiece and the flank face wear of the indexable insert were measured. The results thereof are shown in Tables II and III. In the surface roughness of the workpiece (Rz: regulated in JIS B0601 and measured using a device according to JIS B0651), a smaller numerical value indicates better smoothness. In the flank face wear, a smaller numerical value indicates higher wear resistance.

(Conditions of Turning Test)

Workpiece: SCM415

Cutting speed: 120 m/min

Feed: 0.13 mm/rev

Depth of cut: 1.0 mm

Lubricant: None

Cutting time: 35 min

TABLE II

| | Indexable insert No. | Coating No. | Treatment process | Flank face wear (mm) | Surface roughness of work-piece Rz (μm) | Welding of work-piece material on cutting edge | Machined surface of work-piece | Identification of use of cutting edge |
|---|---|---|---|---|---|---|---|---|
| | 1 | 1 | A | 0.118 | 5.5 | Large | Cloudy | Easy |
| | 2 | 1 | B | 0.121 | 5.1 | Large | Cloudy | Easy |
| | 3 | 1 | C | 0.123 | 2.8 | (Note 1) | (Note 2) | Easy |
| * | 4 | 1 | D | 0.109 | 2.1 | None | Close to specular | Easy |
| * | 5 | 1 | E | 0.120 | 2.4 | None | Close to specular | Easy |
| * | 6 | 1 | F | 0.116 | 2.2 | None | Close to specular | Easy |
| | 7 | 1 | G | 0.112 | 2.3 | None | Close to specular | Difficult |
| | 8 | 2 | A | 0.159 | 5.5 | Large | Cloudy | Easy |
| | 9 | 2 | B | 0.153 | 4.7 | Large | Cloudy | Easy |
| | 10 | 2 | C | 0.142 | 2.9 | (Note 1) | (Note 2) | Easy |
| * | 11 | 2 | D | 0.141 | 2.4 | None | Close to specular | Easy |
| * | 12 | 2 | E | 0.139 | 2.5 | None | Close to specular | Easy |
| * | 13 | 2 | F | 0.138 | 2.7 | None | Close to specular | Easy |
| | 14 | 2 | G | 0.135 | 2.7 | None | Close to specular | Difficult |
| | 15 | 3 | A | 0.123 | 6.1 | Large | Cloudy | Easy |
| | 16 | 3 | B | 0.114 | 5.1 | Large | Cloudy | Easy |
| | 17 | 3 | C | 0.098 | 3.1 | (Note 1) | (Note 2) | Easy |
| * | 18 | 3 | D | 0.096 | 3.0 | None | Close to specular | Easy |
| * | 19 | 3 | E | 0.095 | 2.9 | None | Close to specular | Easy |
| * | 20 | 3 | F | 0.096 | 2.9 | None | Close to specular | Easy |
| | 21 | 3 | G | 0.099 | 2.8 | None | Close to specular | Difficult |

(Note 1) Small amount of welding on rake face
(Note 2) Almost close to specular

TABLE III

| | Indexable insert No. | Coating No. | Treatment process | Flank face wear (mm) | Surface roughness of work-piece Rz (μm) | Welding of work-piece material on cutting edge | Machined surface of work-piece | Identification of use of cutting edge |
|---|---|---|---|---|---|---|---|---|
| | 22 | 4 | A | 0.121 | 5.4 | Large | Cloudy | Easy |
| | 23 | 4 | B | 0.116 | 5.3 | Large | Cloudy | Easy |
| | 24 | 4 | C | 0.100 | 2.8 | (Note 1) | (Note 2) | Easy |
| * | 25 | 4 | D | 0.090 | 2.2 | None | Close to specular | Easy |
| * | 26 | 4 | E | 0.081 | 2.3 | None | Close to specular | Easy |
| * | 27 | 4 | F | 0.079 | 2.2 | None | Close to specular | Easy |
| | 28 | 4 | G | 0.083 | 2.3 | None | Close to specular | Difficult |
| | 29 | 5 | A | 0.110 | 5.4 | Large | Cloudy | Easy |
| | 30 | 5 | B | 0.102 | 4.8 | Large | Cloudy | Easy |
| | 31 | 5 | C | 0.064 | 2.4 | (Note 1) | (Note 2) | Easy |
| * | 32 | 5 | D | 0.055 | 2.1 | None | Close to specular | Easy |
| * | 33 | 5 | E | 0.054 | 2.0 | None | Close to specular | Easy |
| * | 34 | 5 | F | 0.056 | 2.1 | None | Close to specular | Easy |
| | 35 | 5 | G | 0.054 | 2.0 | None | Close to specular | Difficult |

TABLE III-continued

| Indexable insert No. | Coating No. | Treatment process | Flank face wear (mm) | Surface roughness of work-piece Rz (μm) | Welding of work-piece material on cutting edge | Machined surface of work-piece | Identification of use of cutting edge |
|---|---|---|---|---|---|---|---|
| 36 | 6 | A | 0.126 | 5.9 | Large | Cloudy | Easy |
| 37 | 6 | B | 0.125 | 5.5 | Large | Cloudy | Easy |
| 38 | 6 | C | 0.120 | 2.8 | (Note 1) | (Note 2) | Easy |
| * 39 | 6 | D | 0.115 | 2.0 | None | Close to specular | Easy |
| * 40 | 6 | E | 0.111 | 2.2 | None | Close to specular | Easy |
| * 41 | 6 | F | 0.110 | 2.1 | None | Close to specular | Easy |
| 42 | 6 | G | 0.109 | 2.0 | None | Close to specular | Difficult |

(Note 1) Small amount of welding on rake face
(Note 2) Almost close to specular

In Tables II and III, those marked with asterisk "*" are examples of the present invention. The outermost layer of the base layer is black regardless of the type of coating. With respect to the wear-indicating layer, TiN and ZrN are gold, TiCN is pink, and CrN is silver.

As is evident from Tables II and III, in the indexable inserts Nos. 4, 5, 6, 11, 12, 13, 18, 19, 20, 25, 26, 27, 32, 33, 34, 39, 40, and 41, which are examples of the present invention, the identification of use of the cutting edge is easy, exhibiting a very excellent alerting function, the workpiece material is not welded on the cutting edge, the machined surface of the workpiece is close to specular, and the surface roughness of the workpiece is excellent. Furthermore, in each of the indexable inserts in examples of the present invention, the relationship 0.8>A/B was satisfied, wherein A (μm) represents the surface roughness Ra of the region A1, and B (μm) represents the surface roughness Ra of the region A2 (the measurement method was the same as that described below with respect to No. 4).

In contrast, in the indexable inserts Nos. 1, 2, 8, 9, 15, 16, 22, 23, 29, 30, 36, and 37, although the identification of use of the cutting edge is possible, the workpiece material is welded in a large amount on the cutting edge, the machined surface of the workpiece is cloudy, and the surface roughness of the workpiece is poor. Furthermore, in the indexable inserts Nos. 3, 10, 17, 24, 31, and 38, although the amount of welding of the workpiece material is considerably low compared with the indexable inserts Nos. 1, 2, 8, 9, 15, 16, 22, 23, 29, 30, 36, and 37, a slight amount of welding occurs in the rake face. In the indexable inserts Nos. 7, 14, 21, 28, 35, and 42, although the machined surface of the workpiece is satisfactory, the identification of use of the cutting edge is difficult, and the alerting function is not exhibited.

As is evident from the results descried above, the indexable inserts according to the examples of the present invention are highly advantageous over the indexable inserts according to the comparative examples. Furthermore, although the indexable inserts provided with chip breakers are shown in this example, the present invention is also effective to indexable inserts not provided with chip breakers.

Furthermore, indexable inserts Nos. 4-2, 4-3, and 4-4 according to the present invention were produced by the same method as that of the indexable insert No. 4 except that the region A1 was subjected to treatment by blasting of varied degrees. The surface roughness Ra of the region A1 and the surface roughness Ra of the region A2 are shown in Table IV. The surface roughness Ra was measured using a laser microscope (VK-8510, manufactured by KEYENCE Corporation). In the region A1, the measurement was performed at the point where the distance from the cutting edge corresponded to a half of the width of the region A1 (i.e., at the center of the region A1). In the region A2, the measurement was performed at the point which was apart from the border between the region A1 and the region A2 toward the region A2, by a distance equal to a half of the width of the region A1, and which was parallel to the border. The measurement distance was 100 μm.

With respect to the indexable inserts Nos. 4, 4-2, 4-3, and 4-4, a turning test was performed under the same conditions as those described above, and the surface roughness Rz of the workpiece was measured in the same manner as that described above. The results thereof are shown in Table IV.

TABLE IV

| Indexable insert No. | Surface roughness Ra | | A/B | Surface roughness of workpiece (Rz) |
|---|---|---|---|---|
| | Region (A1) Aμm | Region (A2) Bμm | | |
| 4 | 0.18 | 0.32 | 0.56 | 2.1 |
| 4-2 | 0.32 | 0.33 | 0.97 | 2.6 |
| 4-3 | 0.25 | 0.32 | 0.78 | 2.3 |
| 4-4 | 0.08 | 0.28 | 0.29 | 1.8 |

As is evident from Table IV, as the value A/B decreases, the surface roughness Rz of the workpiece becomes more satisfactory, wherein A (μm) represents the surface roughness Ra of the region A1, and B (μm) represents the surface roughness Ra of the region A2.

As is evident from the results, in order to prevent the welding phenomenon between the indexable insert and the workpiece and to prevent the appearance of the workpiece from being impaired, it is effective to set the value A/B so as to satisfy the relationship 1.0>A/B, wherein A (μm) represents the surface roughness Ra of the region A1, and B (μm) represents the surface roughness Ra of the region A2. It is more effective to further decrease the A/B value so as to satisfy the relationship 0.8>A/B, and still more effective to decrease the A/B value so as to satisfy the relationship 0.6>A/B.

Furthermore, indexable inserts were produced in the same manner as those using the coating No. 6 except that the wear-indicating layer was formed using metal Cr or metal Al instead of CrN by a known sputtering method at the same thickness. The resulting indexable inserts were subjected to the same treatment processes, and the same turning test was performed. It was confirmed that the same results as those of the indexable inserts Nos. 36 to 42 were obtained. Note that the color of the wear-indicating layer composed of metal Cr or metal Al is silver.

Example 2

A body was produced as in Example 1 except that the shape of the body of an indexable insert was the same as that of SPGN120408 (ISO standard).

The following layers were formed from the bottom in that order by a known thermal CVD method over the entire surface of the body. That is, a TiN layer with a thickness of 0.4 μm, a TiCN layer (MT-CVD) with a thickness of 3.0 μm, an α-alumina ($Al_2O_3$) layer with a thickness of 1.8 μm, and a TiN layer as an outermost layer with a thickness of 0.5 μm were formed by coating in that order on the surface of the body (total thickness 5.7 μm). In this coating (coating No. 7), the TiN layer with a thickness of 0.4 μm (on the body surface side), the TiCN layer with a thickness of 3.0 μm, and the α-alumina ($Al_2O_3$) layer with a thickness of 1.8 μm constituted a base layer (black), and the TiN layer with a thickness of 0.5 μm as the outermost layer constituted a wear-indicating layer (gold).

In place of the coating No. 7, coatings Nos. 8 to 12 shown in Table V below were each formed over the entire surface of a corresponding body in the same manner.

TABLE V

| | Coating | | |
|---|---|---|---|
| No. | Base layer | Wear-indicating layer | Total thickness |
| 7 | TiN(0.4 μm)/TiCN(MT-CVD, 3.0 μm)/α-$Al_2O_3$(1.8 μm) | TiN(0.5 μm) | 5.7 μm |
| 8 | TiC(0.4 μm)/TiCN(MT-CVD, 3.6 μm)/TiBN(0.8 μm)/κ-$Al_2O_3$(1.2 μm) | TiN(0.4 μm) | 6.4 μm |
| 9 | TiN(0.4 μm)/TiCN(MT-CVD, 4.9 μm)/$ZrO_2$(1.1 μm) | TiN(0.4 μm) | 6.8 μm |
| 10 | TiAlN(2.5 μm)/α-$Al_2O_3$(1.3 μm) | TiN(0.4 μm) | 4.2 μm |
| 11 | CrAlN(3.2 μm)/κ-$Al_2O_3$(1.2 μm) | TiCN(0.3 μm) | 4.7 μm |
| 12 | TiN(0.4 μm)/TiAlN(3.8 μm) | TiCN(0.5 μm) | 4.7 μm |

In Table V, in each base layer, the layers were deposited over the surface of the body in the order from the left to the right. In the coatings 8 and 9, as in the coating No. 7, the layers were each formed by a known thermal CVD method. In the coatings 10 to 12, the layers were each formed by a known PVD method.

With respect to each of the bodies applied with the coatings, the treatment processes A to G were performed as in Example 1. Thereby, 42 indexable inserts Nos. 43 to 84 shown in Tables VI and VII were produced. Cutting inserts Nos. 46, 47, 48, 53, 54, 55, 60, 61, 62, 67, 68, 69, 74, 75, 76, 81, 82, and 83 are examples of the present invention, and the other cutting inserts are comparative examples.

With respect to the indexable inserts Nos. 43 to 84, a milling test was performed under the following conditions, and the surface roughness of the workpiece and the flank face wear of the indexable insert were measured. The results thereof are shown in Tables VI and VII. In the surface roughness of the workpiece (Rz: regulated in JIS B0601 and measured using a device according to JIS B0651), a smaller numerical value indicates better smoothness. In the flank face wear, a smaller numerical value indicates higher wear resistance.

(Conditions of milling test)
Workpiece: FC250
Cutting speed: 175 m/mm
Feed: 0.27 mm/teeth
Depth of cut: 1.0 mm
Lubricant: None
Cutting length: 11 m
Cutter: DPG4160R (Sumitomo Electric Hardmetal Corp.)

In the milling test, since only one indexable insert was fixed on the cutter, the feed per revolution of the cutter was equal to the feed per stroke.

TABLE VI

| | Indexable insert No. | Coating No. | Treatment process | Flank face wear (mm) | Surface roughness of workpiece Rz (μm) | Welding of workpiece material on cutting edge | Machined surface of work-piece | Identification of use of cutting edge |
|---|---|---|---|---|---|---|---|---|
| | 43 | 7 | A | 0.101 | 9.6 | Large | Cloudy | Easy |
| | 44 | 7 | B | 0.097 | 9.1 | Large | Cloudy | Easy |
| | 45 | 7 | C | 0.081 | 6.0 | (Note 1) | (Note 2) | Easy |
| * | 46 | 7 | D | 0.073 | 5.7 | None | Close to specular | Easy |
| * | 47 | 7 | E | 0.075 | 5.5 | None | Close to specular | Easy |
| * | 48 | 7 | F | 0.072 | 5.4 | None | Close to specular | Easy |
| | 49 | 7 | G | 0.077 | 5.5 | None | Close to specular | Difficult |
| | 50 | 8 | A | 0.149 | 9.5 | Large | Cloudy | Easy |
| | 51 | 8 | B | 0.142 | 8.6 | Large | Cloudy | Easy |
| | 52 | 8 | C | 0.110 | 5.9 | (Note 1) | (Note 2) | Easy |

TABLE VI-continued

| | Indexable insert No. | Coating No. | Treatment process | Flank face wear (mm) | Surface roughness of work-piece Rz (μm) | Welding of work-piece material on cutting edge | Machined surface of work-piece | Identification of use of cutting edge |
|---|---|---|---|---|---|---|---|---|
| * | 53 | 8 | D | 0.097 | 5.4 | None | Close to specular | Easy |
| * | 54 | 8 | E | 0.095 | 5.3 | None | Close to specular | Easy |
| * | 55 | 8 | F | 0.096 | 5.0 | None | Close to specular | Easy |
|   | 56 | 8 | G | 0.090 | 5.1 | None | Close to specular | Difficult |
|   | 57 | 9 | A | 0.112 | 9.8 | Large | Cloudy | Easy |
|   | 58 | 9 | B | 0.113 | 9.1 | Large | Cloudy | Easy |
|   | 59 | 9 | C | 0.085 | 6.5 | (Note 1) | (Note 2) | Easy |
| * | 60 | 9 | D | 0.079 | 6.0 | None | Close to specular | Easy |
| * | 61 | 9 | E | 0.078 | 6.1 | None | Close to specular | Easy |
| * | 62 | 9 | F | 0.077 | 5.8 | None | Close to specular | Easy |
|   | 63 | 9 | G | 0.076 | 5.7 | None | Close to specular | Difficult |

(Note 1) Small amount of welding on rake face
(Note 2) Almost close to specular

TABLE VII

| | Indexable insert No. | Coating No. | Treatment process | Flank face wear (mm) | Surface roughness of work-piece Rz (μm) | Welding of work-piece material on cutting edge | Machined surface of work-piece | Identification of use of cutting edge |
|---|---|---|---|---|---|---|---|---|
|   | 64 | 10 | A | 0.088 | 7.1 | Large | Cloudy | Easy |
|   | 65 | 10 | B | 0.082 | 6.8 | Large | Cloudy | Easy |
|   | 66 | 10 | C | 0.061 | 3.8 | (Note 1) | (Note 2) | Easy |
| * | 67 | 10 | D | 0.058 | 3.2 | None | Close to specular | Easy |
| * | 68 | 10 | E | 0.055 | 3.1 | None | Close to specular | Easy |
| * | 69 | 10 | F | 0.053 | 2.9 | None | Close to specular | Easy |
|   | 70 | 10 | G | 0.049 | 2.9 | None | Close to specular | Difficult |
|   | 71 | 11 | A | 0.093 | 7.2 | Large | Cloudy | Easy |
|   | 72 | 11 | B | 0.088 | 6.8 | Large | Cloudy | Easy |
|   | 73 | 11 | C | 0.066 | 3.8 | (Note 1) | (Note 2) | Easy |
| * | 74 | 11 | D | 0.061 | 3.3 | None | Close to specular | Easy |
| * | 75 | 11 | E | 0.059 | 3.2 | None | Close to specular | Easy |
| * | 76 | 11 | F | 0.058 | 3.0 | None | Close to specular | Easy |
|   | 77 | 11 | G | 0.059 | 3.2 | None | Close to specular | Difficult |
|   | 78 | 12 | A | 0.095 | 8.6 | Large | Cloudy | Easy |
|   | 79 | 12 | B | 0.091 | 8.3 | Large | Cloudy | Easy |
|   | 80 | 12 | C | 0.076 | 4.6 | (Note 1) | (Note 2) | Easy |
| * | 81 | 12 | D | 0.062 | 4.1 | None | Close to specular | Easy |
| * | 82 | 12 | E | 0.061 | 4.0 | None | Close to specular | Easy |
| * | 83 | 12 | F | 0.060 | 3.9 | None | Close to specular | Easy |
|   | 84 | 12 | G | 0.062 | 3.8 | None | Close to specular | Difficult |

(Note 1) Small amount of welding on rake face
(Note 2) Almost close to specular

In Tables VI and VII, those marked with asterisk "*" are examples of the present invention. The outermost layer of the base layer is black regardless of the type of coating. With respect to the wear-indicating layer, TiN is gold, and TiCN is pink.

As is evident from Tables VI and VII, in the indexable inserts Nos. 46, 47, 48, 53, 54, 55, 60, 61, 62, 67, 68, 69, 74, 75, 76, 81, 82, and 83, which are examples of the present invention, the identification of use of the cutting edge is easy, exhibiting a very excellent alerting function, the workpiece material is not welded on the cutting edge, the machined surface of the workpiece is close to specular, and the surface roughness of the workpiece is excellent. Furthermore, in each of the indexable inserts in examples of the present invention, the relationship 0.8>A/B was satisfied, wherein A (μm) represents the surface roughness Ra of the region A1, and B (elm) represents the surface roughness Ra of the region A2 (the measurement method was the same as that described in Example 1).

In contrast, in the indexable inserts Nos. 43, 44, 50, 51, 57, 58, 64, 65, 71, 72, 78, and 79, although the identification of use of the cutting edge is possible, the workpiece material is welded in a large amount on the cutting edge, the machined surface of the workpiece is cloudy, and the surface roughness of the workpiece is poor. Furthermore, in the indexable inserts Nos. 45, 52, 59, 66, 73, and 80, although the amount of welding of the workpiece material is considerably low compared with the indexable inserts Nos. 43, 44, 50, 51, 57, 58, 64, 65, 71, 72, 78, and 79, a slight amount of welding occurs in the rake face. In the indexable inserts Nos. 49, 56, 63, 70, 77, and 84, although the machined surface of the workpiece is satisfactory, the identification of use of the cutting edge is difficult, and the alerting function is not exhibited.

As is evident from the results descried above, the indexable inserts according to the examples of the present invention are highly advantageous over the indexable inserts according to the comparative examples.

Example 3

A cemented carbide powder having a composition including 0.1% by mass of TiC, 0.6% by mass of TaC, 0.3% by mass of NbC, 6.0% by mass of Co, and the balance being WC (including incidental impurities) was pressed. Subsequently, the resulting compact was sintered in a vacuum atmosphere at 1,450° C. for 1 hour, and then subjected to planarization polishing. A cutting edge part was subjected to cutting-edge treatment (honing with a width of 0.05 mm on the rake face side). Thereby, an insert made of a cemented carbide having the same shape as that of a cutting insert CNMG120408N-UX (manufactured by Sumitomo Electric Hardmetal Corp.) was obtained and used as a body. In the body, a beta-free layer was not disposed on the surface thereof, two surfaces each served as a rake face, and four surfaces each served as a flank face, each rake face being connected to each flank face with a cutting edge (which was a hypothetical edge because of the cutting-edge treatment performed as described above) therebetween. Total eight cutting edges were present.

The following layers were formed from the bottom in that order by a known thermal CVD method over the entire surface of the body. That is, a TiN layer with a thickness of 0.2 μm, a TiCN layer (MT-CVD) with a thickness of 3.0 μm, an α-alumina ($Al_2O_3$) layer with a thickness of 2.4 μm, and a TiN layer as an outermost layer with a thickness of 0.3 μm were formed by coating in that order on the surface of the body. In this coating (coating No. 13), the TiN layer with a thickness of 0.2 μm (on the body surface side), the TiCN layer with a thickness of 3.0 μm, and the α-alumina ($Al_2O_3$) layer with a thickness of 2.4 μm constituted a base layer, and the TiN layer with a thickness of 0.3 μm as the outermost layer constituted a wear-indicating layer.

In place of the coating No. 13, coatings Nos. 14 to 17 shown in Table VIII below were each formed over the entire surface of a corresponding body in the same manner.

TABLE VIII

| No. | Coating Base layer | Wear-indicating layer |
|---|---|---|
| 13 | TiN(0.2 μm)/TiCN(MT-CVD, 3.0 μm)/α-$Al_2O_3$(2.4 μm) | TiN(0.3 μm) |
| 14 | TiC(0.2 μm)/TiCN(MT-CVD, 2.8 μm)/TiN(0.4 μm)/κ-$Al_2O_3$(2.0 μm) | TiCN(0.3 μm) |
| 15 | TiN(0.3 μm)/TiCN(MT-CVD, 4.7 μm)/TiC(1.4 μm)/κ-$Al_2O_3$(1.8 μm) | TiN(0.3 μm) |
| 16 | TiN(0.3 μm)/TiCN(MT-CVD, 6.4 μm)/TiCN(HT-CVD, 0.8 μm)/TiBN(0.3 μm)/α-$Al_2O_3$(3.5 μm) | TiN(0.3 μm) |
| 17 | TiN(0.4 μm)/TiCN(MT-CVD, 4.6 μm)/TiCNO(0.2 μm)/α-$Al_2O_3$(2.0 μm) | ZrN(0.2 μm) |

(Note)
In the base layer of the coating No. 17, α-$Al_2O_3$ contains 1.4% by mass of elemental Zr (analysis results with electron probe microanalysis (EPMA)).

In Table VIII, in each base layer, the layers were deposited over the surface of the body in the order from the left to the right. The individual layers were each formed by a known thermal CVD method.

With respect to each of the bodies applied with the coatings, any of fourteen treatment processes A to I3 was performed using a known blasting method (alumina sand No. 120 (average grain size 100 μm), pressure 0.28 MPa) or a method other than blasting. The treatment processes A, B, C, and G are the treatment processes used in Example 1, and the other treatment processes are as follows. In each treatment process, a part in which the wear-indicating layer was to be left was masked with a jig.

(Treatment Process H1)

With respect to the coating, the wear-indicating layer formed over the entire surface of the flank face and formed on the rake face in a region A1 extending to a distance of 0.2 to 1.2 mm from the cutting edge was removed by blasting. Consequently, a region A2 lying on an area of the rake face other than that of the region A1 extending to a distance of 0.2 to 1.2 mm from the cutting edge had the color of the wear-indicating layer (for example, in the coating No. 13, gold, i.e., the color of TiN), and the region A1 lying on the rake face and extending to a distance of 0.2 to 1.2 mm from the cutting edge and the flank face (including the cutting edge) had the color of the base layer (for example, in the coating No. 13, black, i.e., the color of $Al_2O_3$) (refer FIG. 5). The distance of 0.2 to 1.2 mm is an average value. The average value was expressed in such a range for the same reason as that in Example 1. Incidentally, the distance at a position that divides in half the angle of the acute-angled corner of the rake face (hereinafter referred to as the "R/2 position") was 0.35 mm.

(Treatment Processes H2 to H5)

The same treatment process as the treatment process H1 was performed except that the region A1 was defined as a region that extended to a distance of 0 to 1.2 mm from the cutting edge over the rake face (the distance at the R/2 position being 0.35 mm, the same as that in the treatment process H1). The inclusion of 0 mm in the distance from the cutting edge means that the wear-indicating layer is formed on the rake face and in the region A1 (in other words, the region A1 includes a portion where the wear-indicating layer is not removed). The treatment processes H2 to H5 differ from each other in that different residual stresses are imparted as shown in Tables IX and X below due to varied blasting conditions.

(Treatment Processes H6 and H7)

With respect to the coating, the same treatment by blasting as that in the treatment processes H2 to H5 was performed (the distance at the R/2 position being 0.35 mm, the same as that in the treatment processes H2 to H5), and then a treatment by brushing (using a diamond brush) was performed on the region which had been subjected to blasting. The treatment processes H6 and H7 differ from each other in that different residual stresses are imparted as shown in Tables IX and X below due to varied blasting conditions.

(Treatment Process I1)

With respect to the coating, the wear-indicating layer formed over the entire surface of the flank face and formed on the rake face in a region A1 extending to a distance of 0.2 to 2.4 mm from the cutting edge was removed by blasting. Consequently, a region A2 lying on an area of the rake face other than that of the region A1 extending to a distance of 0.2 to 2.4 mm from the cutting edge had the color of the wear-indicating layer (for example, in the coating No. 13, gold, i.e., the color of TiN), and the region A1 lying on the rake face and extending to a distance of 0.2 to 2.4 mm from the cutting edge and the flank face (including the cutting edge) had the color of the base layer (for example, in the coating No. 13, black, i.e., the color of $Al_2O_3$) (refer FIG. 5). The distance of 0.2 to 2.4 mm is an average value. The average value was expressed in such a range for the same reason as that in Example 1. Incidentally, the distance at the R/2 position was 1.52 mm.

(Treatment Process I2)

With respect to the coating, the wear-indicating layer formed over the entire surface of the flank face and formed on the rake face in a region A1 extending to a distance of 0 to 2.4 mm (the distance at the R/2 position being 1.52 mm, the same as that in the treatment process I1) from the cutting edge was removed by brushing (using a diamond brush). Subsequently, the same treatment by blasting as that in the treatment process I1 was performed on the region which had been subjected to brushing. The inclusion of 0 mm in the distance from the cutting edge means that the wear-indicating layer is formed on the rake face and in the region A1 (in other words, the region A1 includes a portion where the wear-indicating layer is not removed).

(Treatment Process I3)

With respect to the coating, a treatment by barrel processing was performed on a region corresponding to the region on which brushing was performed in the treatment process I2 (the distance at the R/2 position being 1.52 mm, the same as that in the treatment process I1), and then a treatment by brushing (using a diamond brush) was performed on the region which had been subjected to barrel processing to remove the wear-indicating layer.

Figure 8:
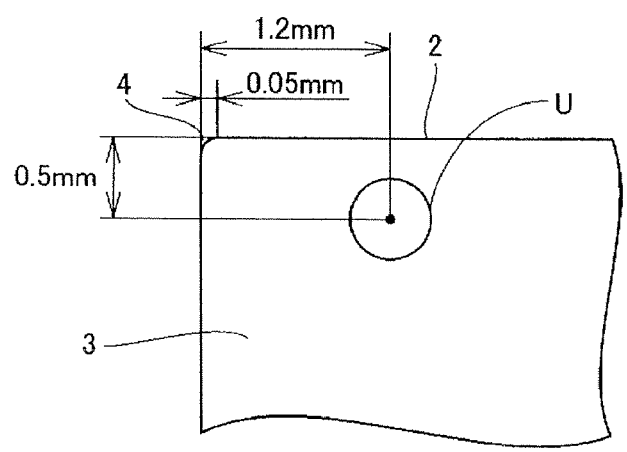
FIG. 8 is a schematic side view showing a region in the vicinity of a cutting edge corner on the flank face side of an indexable insert.

In such a manner, 46 indexable inserts Nos. 85 to 130 shown in Tables IX and X were produced. In Tables IX and X, those marked with asterisk "*" are examples of the present invention, and the coating No. denotes the coating Nos. 13 to 17 described above. In the indexable insert in each of the examples, compressive residual stress can be imparted to the region subjected to blasting or blasting combined with brushing (or barrel processing combined with brushing) (i.e., the region in which the wear-indicating layer is not disposed on the base layer and which includes the area that participates in cutting). (In such a case, the region other than this region has tensile residual stress.) Tables IX and X show the value measured in each alumina layer in a region indicated by a spot U (spot size: diameter 0.5 mm) on the flank face shown in FIG. 8 (the region being a part of the area that participates in cutting). (As the specific measurement method, the above-described $\sin^2 \psi$ technique using an X-ray stress measurement device was employed.)

With respect to the treatment processes H1 to H7 and the treatment processes I1 to I3, the proportion of the region where, at the cutting edge participating in cutting, instead of the alumina layer ($\alpha$-$Al_2O_3$ layer or $\gamma$-$Al_2O_3$ layer) which was the outermost layer in the base layer, the underlying layer of the alumina layer (the underlying layer being a part of the base layer) was exposed was calculated by the following method. That is, the indexable insert was observed with a scanning electron microscope and a micrograph enabling the state of the presence of the alumina layer to be confirmed was taken. A line corresponding to the cutting edge with a length of the cutting edge was drawn on the micrograph, and the proportion of the region where the alumina layer was not present on the line was calculated in percentage.

Figure 9:
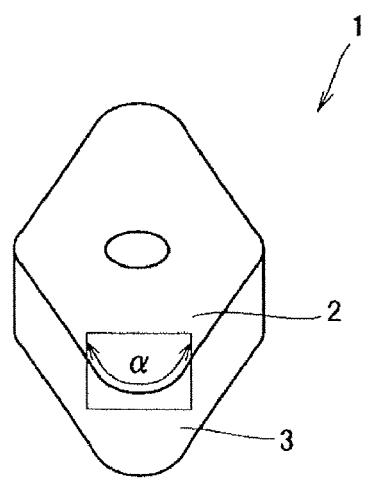
FIG. 9 is a schematic diagram of an indexable insert in which the length of a cutting edge is shown.
Figure 10:
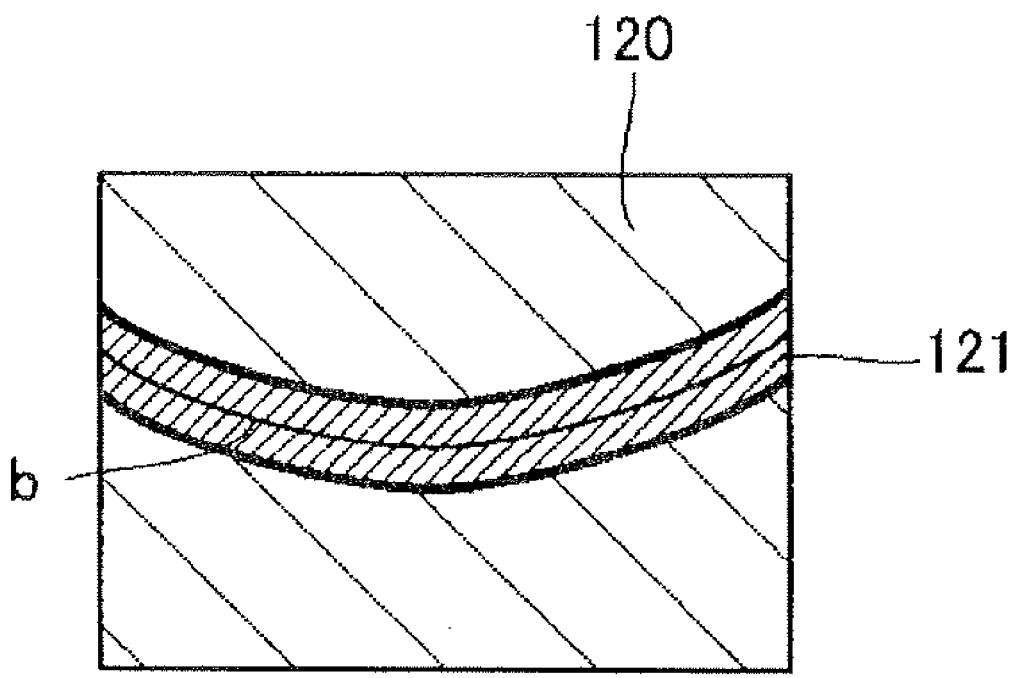
FIG. 10 is a schematic diagram of a scanning electron micrograph showing an enlarged view of the range α shown in FIG. 9.
Figure 11:
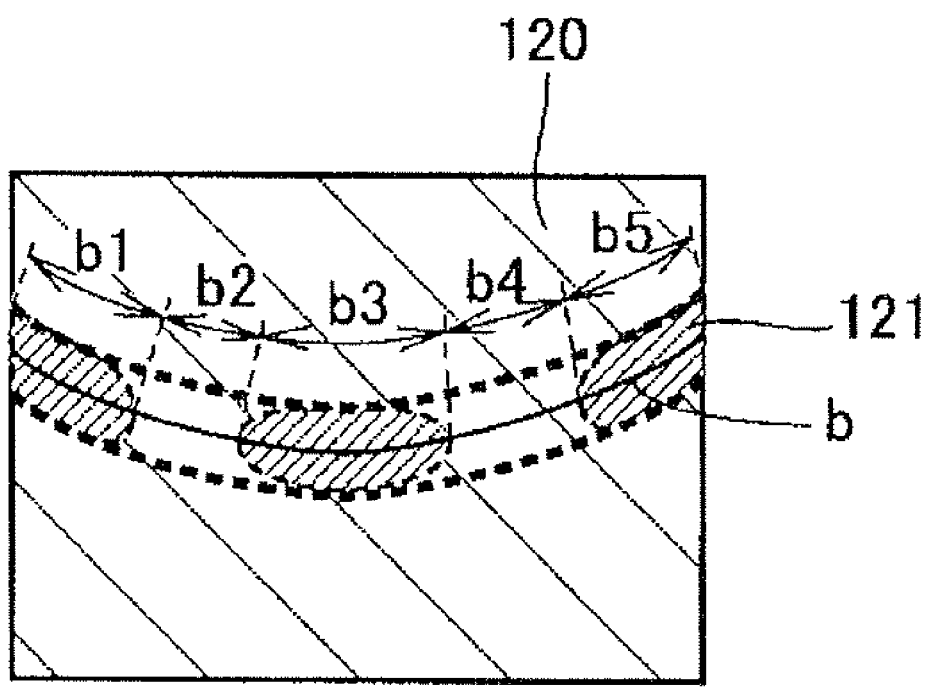
FIG. 11 is a schematic diagram of another scanning electron micrograph showing an enlarged view of the range α shown in FIG. 9.

FIGS. 9 to 11, which are schematic diagrams that are based on scanning electron micrographs, show the method described above more specifically. That is, in FIG. 9, the range $\alpha$ represents the length of the cutting edge. FIGS. 10 and 11 each show an enlarged view of the range $\alpha$. FIG. 10 shows a case in which an alumina layer 120 is not formed over the entire cutting edge 4 that participates in cutting (i.e., the underlying layer 121 is exposed over the entire cutting edge 4), and FIG. 11 shows a case in which an alumina layer 120 is not formed on parts of the cutting edge 4 that participates in cutting and the underlying layer 121 is exposed.

In each of FIGS. 10 and 11, a line b as the cutting edge 4 is drawn, and the length of portions where the alumina layer 120 is not formed on the line b is measured. In FIG. 10, the alumna layer 120 is not present at all on the line b. Consequently, the proportion of the region where the alumina layer 120 is not formed is 100% (all). In FIG. 11, there are portions (b1, b3, and b5) where the alumina layer 120 is not formed on the line b, and the percentage calculated by the expression (b1+b3+b5)/(b1+b2+b3+b4+b5) corresponds to the proportion of the region where the alumina layer 120 is not formed.

As a result of calculations by the method described above, in the treatment processes H1 to H5 and the treatment process I1, in the cutting edge participating in cutting (i.e., in a part shown in FIGS. 9 to 11 in this example), the alumina layer 120 was not removed at all (i.e., the underlying layer 121 was not exposed), while in the treatment processes H6, H7, I2, and I3, the underlying layer 121 was exposed to the surface at a ratio of 37%, 68%, 82%, and 24%, respectively, in the cutting edge participating in cutting.

With respect to the indexable inserts Nos. 85 to 130, a continuous turning test and an intermittent turning test were performed under the following conditions, and the flank face wear and fracture rate of the indexable insert were measured. Furthermore, under the following conditions, the welding of the workpiece material on the cutting edge, the state of the machined surface of the workpiece, and the identification of use of the cutting edge were checked. The results thereof are shown in Tables IX and X below. In the flank face wear, a smaller numerical value indicates higher wear resistance. In the fracture rate, a smaller numerical value indicates higher toughness.

(Conditions of Continuous Turning Test)
Workpiece: FCD450 round bar
Cutting speed: 200 m/min
Feed: 0.35 mm/rev
Depth of cut: 2.0 mm
Lubricant: water-soluble oil
Cutting time: 10 min Under these conditions, the welding of the workpiece material on the cutting edge and the state of the machined surface of the workpiece one minute after the start of cutting were observed, and the flank face wear was measured.

(Conditions of Intermittent Turning Test)
Workpiece: SCM435 (round bar with four grooves)
Cutting speed: 100 m/min
Feed: 0.40 mm/rev
Depth of cut: 2.0 mm
Lubricant: None
Cutting time: 30 sec The fracture rate was calculated from the number of fractures when 20 cutting edges were used for cutting for 30 seconds. That is, fracture rate (%)=n/20, wherein n represents the number of fractured cutting edges.

TABLE IX

| | Indexable insert No. | Coating No. | Treatment process | Residual stress (Gpa) | Flank face wear (mm) | Fracture rate (%) | Welding of workpiece material on cutting edge | Machined surface of workpiece | Identification of use of cutting edge |
|---|---|---|---|---|---|---|---|---|---|
| | 85 | 13 | A | 0.21 | 0.256 | 100 | Large | Cloudy | Easy |
| | 86 | 13 | B | 0.21 | 0.253 | 100 | Large | Cloudy | Easy |
| | 87 | 13 | C | 0.01 | 0.240 | 85 | (Note 1) | (Note 2) | Difficult |
| * | 88 | 13 | H1 | −0.32 | 0.217 | 55 | None | (Note 3) | Easy |
| * | 89 | 13 | I1 | −1.21 | 0.213 | 40 | None | (Note 3) | Easy |
| | 90 | 13 | G | 0.05 | 0.214 | 80 | None | (Note 3) | Difficult |
| | 91 | 14 | A | 0.22 | 0.268 | 100 | Large | Cloudy | Easy |
| | 92 | 14 | B | 0.22 | 0.268 | 100 | Large | Cloudy | Easy |
| | 93 | 14 | C | 0.04 | 0.253 | 80 | (Note 1) | (Note 2) | Difficult |
| * | 94 | 14 | H1 | −0.51 | 0.225 | 50 | None | (Note 3) | Easy |
| * | 95 | 14 | I1 | −1.13 | 0.224 | 40 | None | (Note 3) | Easy |
| | 96 | 14 | G | 0.05 | 0.223 | 80 | None | (Note 3) | Difficult |
| | 97 | 15 | A | 0.19 | 0.245 | 100 | Large | Cloudy | Easy |
| | 98 | 15 | B | 0.19 | 0.243 | 100 | Large | Cloudy | Easy |
| | 99 | 15 | C | 0.05 | 0.238 | 85 | (Note 1) | (Note 2) | Difficult |
| * | 100 | 15 | H1 | −0.43 | 0.215 | 55 | None | (Note 3) | Easy |
| * | 101 | 15 | H2 | 0.04 | 0.217 | 75 | None | (Note 3) | Easy |
| * | 102 | 15 | H3 | −0.01 | 0.213 | 60 | None | (Note 3) | Easy |
| * | 103 | 15 | H4 | −1.24 | 0.212 | 50 | None | (Note 3) | Easy |
| * | 104 | 15 | H5 | −3.27 | 0.209 | 30 | None | (Note 3) | Easy |
| * | 105 | 15 | H6 | −1.24 | 0.187 | 40 | None | (Note 3) | Easy |
| * | 106 | 15 | H7 | −1.24 | 0.182 | 35 | None | (Note 3) | Easy |

(Note 1) Small amount of welding on rake face
(Note 2) Almost close to specular
(Note 3) Close to specular and most lustrous

TABLE X

| | Indexable insert No. | Coating No. | Treatment process | Residual stress (Gpa) | Flank face wear (mm) | Fracture rate (%) | Welding of workpiece material on cutting edge | Machined surface of workpiece | Identification of use of cutting edge |
|---|---|---|---|---|---|---|---|---|---|
| * | 107 | 15 | I1 | −0.76 | 0.211 | 60 | None | (Note 3) | Easy |
| * | 108 | 15 | I2 | −2.12 | 0.183 | 35 | None | (Note 3) | Easy |
| * | 109 | 15 | I3 | −0.32 | 0.199 | 55 | None | (Note 3) | Easy |
| | 110 | 15 | G | 0.05 | 0.216 | 75 | None | (Note 3) | Difficult |
| | 111 | 16 | A | 0.26 | 0.187 | 100 | Large | Cloudy | Easy |
| | 112 | 16 | B | 0.26 | 0.186 | 100 | Large | Cloudy | Easy |
| | 113 | 16 | C | 0.06 | 0.182 | 90 | (Note 1) | (Note 2) | Difficult |
| * | 114 | 16 | H1 | −0.42 | 0.164 | 60 | None | (Note 3) | Easy |
| * | 115 | 16 | H2 | 0.05 | 0.163 | 75 | None | (Note 3) | Easy |
| * | 116 | 16 | H3 | −0.02 | 0.163 | 65 | None | (Note 3) | Easy |

TABLE X-continued

| | Indexable insert No. | Coating No. | Treatment process | Residual stress (Gpa) | Flank face wear (mm) | Fracture rate (%) | Welding of work-piece material on cutting edge | Machined surface of work-piece | Identification of use of cutting edge |
|---|---|---|---|---|---|---|---|---|---|
| * | 117 | 16 | H4 | −1.26 | 0.160 | 55 | None | (Note 3) | Easy |
| * | 118 | 16 | H5 | −3.25 | 0.158 | 35 | None | (Note 3) | Easy |
| * | 119 | 16 | H6 | −1.26 | 0.138 | 35 | None | (Note 3) | Easy |
| * | 120 | 16 | H7 | −1.26 | 0.130 | 30 | None | (Note 3) | Easy |
| * | 121 | 16 | I1 | −0.75 | 0.165 | 60 | None | (Note 3) | Easy |
| * | 122 | 16 | I2 | −2.14 | 0.143 | 30 | None | (Note 3) | Easy |
| * | 123 | 16 | I3 | −0.34 | 0.138 | 60 | None | (Note 3) | Easy |
| | 124 | 16 | G | 0.06 | 0.166 | 80 | None | (Note 3) | Difficult |
| | 125 | 17 | A | 0.19 | 0.202 | 100 | Large | Cloudy | Easy |
| | 126 | 17 | B | 0.19 | 0.201 | 100 | Large | Cloudy | Easy |
| | 127 | 17 | C | 0.06 | 0.198 | 80 | (Note 1) | (Note 2) | Difficult |
| * | 128 | 17 | H1 | −0.54 | 0.158 | 50 | None | (Note 3) | Easy |
| * | 129 | 17 | I1 | −1.18 | 0.143 | 40 | None | (Note 3) | Easy |
| | 130 | 17 | G | 0.06 | 0.166 | 80 | None | (Note 3) | Difficult |

(Note 1) Small amount of welding on rake face
(Note 2) Almost close to specular
(Note 3) Close to specular and most lustrous In Tables IX and X, those marked with asterisk "*" are examples of the present invention. The outermost layer of the base layer is black regardless of the type of coating. With respect to the wear-indicating layer, TiN and ZrN are gold, and TiCN is pink.

As is evident from Tables IX and X, in the indexable inserts according to the examples of the present invention, the identification of use of the cutting edge (cutting part) is easy, exhibiting a very excellent alerting function, the workpiece material is not welded on the cutting edge, and the machined surface of the workpiece is close to specular. Furthermore, in each of the indexable inserts according to the examples of the present invention, the relationship 0.8>A/B was satisfied, wherein A (μm) represents the surface roughness Ra of the region A1, and B (μm) represents the surface roughness Ra of the region A2 (the measurement method was the same as that for No. 128 which will be described below).

In contrast, with respect to the indexable inserts according to comparative examples (those not marked with asterisk "*" in the tables), in the indexable inserts subjected to the treatment process A or B, although the identification of use of the cutting edge is possible, the workpiece material is welded in a large amount on the cutting edge, the machined surface of the workpiece is cloudy, the flank face wear is large, and the fracture rate is high. In the indexable insert subjected to the treatment process G, although the state of the machined surface of the workpiece, etc. are satisfactory, the identification of use of the cutting edge is difficult, and the alerting function is not exhibited. In the indexable insert subjected to the treatment process C, although the amount of welding of the workpiece material is considerably low, a slight amount of welding occurs in the rake face.

As is evident from the results descried above, the indexable inserts according to the examples of the present invention are highly advantageous over the indexable inserts according to the comparative examples. Consequently, it has been confirmed that in order to prevent the welding phenomenon between the indexable insert and the workpiece and to prevent the appearance of the workpiece from being impaired, it is effective to use a structure in which the wear-indicating layer is disposed, not on the flank face, but on the rake face in a specific region (i.e., the region A2 other than the region A1), and at least one layer (the alumina layer described above) constituting the base layer has compressive residual stress in at least a part of an area in which the wear-indicating layer is not disposed and which participates in cutting. It has also been confirmed that at the cutting edge which participates in cutting, if a layer other than the alumina layer, which is the outermost layer of the base layer, is exposed to the surface, the welding of the workpiece material is further prevented, and more excellent wear resistance is exhibited. Furthermore, although the indexable inserts provided with chip breakers are shown in this example, the present invention is also effective to indexable inserts not provided with chip breakers.

Furthermore, indexable inserts Nos. 128-2, No. 128-3, and No. 128-4 according to the present invention were produced by the same method as that of the indexable insert No. 128 except that the region A1 was subjected to treatment by blasting of varied degrees. The surface roughness Ra of the region A1 and the surface roughness Ra of the region A2 are shown in Table XI. The surface roughness Ra was measured using a laser microscope (VK-8510, manufactured by KEYENCE Corporation). In the region A1, the measurement was performed at the point where the distance from the cutting edge corresponded to a half of the width of the region A1 (i.e., at the center of the region A1). In the region A2, the measurement was performed at the point which was apart from the border between the region A1 and the region A2 toward the region A2, by a distance equal to a half of the width of the region A1, and which was parallel to the border. The measurement distance was 100 μm.

With respect to the indexable inserts Nos. 128, 128-2, 128-3, and 128-4, a turning test was performed under the following conditions, and the surface roughness Rz of the workpiece was measured in the same manner as that Example 1. The results thereof are shown in Table XI.

(Conditions of Turning Test)
Workpiece: SCM415 round bar

Cutting speed: 100 m/min
Feed: 0.12 mm/rev
Depth of cut: 1.0 mm
Lubricant: None
Cutting time: 1 min The surface roughness Rz of the workpiece one minute after the start of cutting was measured.

TABLE XI

| Indexable insert No. | Surface roughness Ra | | A/B | Surface roughness of workpiece (Rz) |
|---|---|---|---|---|
| | Region (A1) Aμm | Region (A2) Bμm | | |
| 128 | 0.21 | 0.34 | 0.62 | 2.2 |
| 128-2 | 0.35 | 0.36 | 0.97 | 2.9 |
| 128-3 | 0.15 | 0.35 | 0.43 | 2.0 |
| 128-4 | 0.07 | 0.30 | 0.23 | 1.8 |

As is evident from Table XI, as the value A/B decreases, the surface roughness Rz of the workpiece becomes more satisfactory, wherein A (μm) represents the surface roughness Ra of the region A1, and B (μm) represents the surface roughness Ra of the region A2.

As is evident from the results, in order to prevent the welding phenomenon between the indexable insert and the workpiece and to prevent the appearance of the workpiece from being impaired, it is effective to set the value A/B so as to satisfy the relationship 1.0>A/B, wherein A (μm) represents the surface roughness Ra of the region A1, and B (μm) represents the surface roughness Ra of the region A2. It is more effective to further decrease the A/B value so as to satisfy the relationship 0.8>A/B, and still more effective to decrease the A/B value so as to satisfy the relationship 0.6>A/B.

Example 4

A cemented carbide powder having a composition including 0.5% by mass of TaC, 0.2% by mass of $Cr_3C_2$, 9.5% by mass of Co, and the balance being WC (including incidental impurities) was pressed. Subsequently, the resulting compact was sintered in a vacuum atmosphere at 1,430° C. for 1 hour, and then subjected to planarization polishing. A cutting edge part was subjected to cutting-edge treatment with a SiC brush (honing with a width of 0.05 mm on the rake face side). Thereby, an insert made of a cemented carbide having the same shape as that of a cutting insert SEMT13T3AGSN-G (manufactured by Sumitomo Electric Hardmetal Corp.) was obtained and used as a body. In the body, a beta-free layer was not disposed on the surface thereof, one surface served as a rake face, and four surfaces each served as a flank face, the rake face being connected to each flank face with a cutting edge (which was a hypothetical edge because of the cutting-edge treatment performed as described above) therebetween. Total four cutting edges were present.

The following layers were formed from the bottom in that order by a known thermal CVD method over the entire surface of the body. That is, a TiN layer with a thickness of 0.2 μm, a TiCN layer (MT-CVD) with a thickness of 3.4 μm, an α-alumina ($Al_2O_3$) layer with a thickness of 2.2 μm, and a TiN layer as an outermost layer with a thickness of 0.3 μm were formed by coating in that order on the surface of the body. In this coating (coating No. 18), the TiN layer with a thickness of 0.2 μm (on the body surface side), the TiCN layer with a thickness of 3.4 μm, and the α-alumina ($Al_2O_3$) layer with a thickness of 2.2 μm constituted a base layer, and the TiN layer with a thickness of 0.3 μm as the outermost layer constituted a wear-indicating layer.

In place of the coating No. 18, coatings Nos. 19 to 22 shown in Table XII below were each formed over the entire surface of a corresponding body in the same manner.

TABLE XII

| | Coating | |
|---|---|---|
| No. | Base layer | Wear-indicating layer |
| 18 | TiN(0.2 μm)/TiCN(MT-CVD, 3.4 μm)/α-$Al_2O_3$(2.2 μm) | TiN(0.3 μm) |
| 19 | TiC(0.3 μm)/TiCN(MT-CVD, 2.4 μm)/TiN(0.3 μm)/κ-$Al_2O_3$(1.8 μm) | TiCN(0.3 μm) |
| 20 | TiN(0.3 μm)/TiCN(MT-CVD, 2.3 μm)/TiC(0.9 μm)/α-$Al_2O_3$(2.1 μm) | TiN(0.2 μm) |
| 21 | TiN(0.4 μm)/TiCN(MT-CVD, 2.4 μm)/TiCN(HT-CVD, 0.8 μm)/TiBN(0.3 μm)/κ-$Al_2O_3$(2.0 μm) | TiN(0.3 μm) |
| 22 | TiN(0.4 μm)/TiCN(MT-CVD, 2.5 μm)/TiCNO(0.3 μm)/α-$Al_2O_3$(2.4 μm) | TiN(0.4 μm) |

In Table XII, in each base layer, the layers were deposited over the surface of the body in the order from the left to the right. The individual layers were each formed by a known thermal CVD method.

With respect to each of the bodies applied with the coatings, any of fourteen treatment processes A to K3 was performed using a known blasting method (alumina sand No. 120 (average grain size 100 μm), pressure 0.28 MPa) or a method other than blasting. The treatment processes A, B, C, and G are the treatment processes used in Example 1, and the other treatment processes are as follows. In each treatment process, a part in which the wear-indicating layer was to be left was masked with a jig.

(Treatment Process J1)

With respect to the coating, the wear-indicating layer formed over the entire surface of the flank face and formed on the rake face in a region A1 extending to a distance of 0.2 to 1.1 mm from the cutting edge was removed by blasting. Consequently, a region A2 lying on an area of the rake face other than that of the region A1 extending to a distance of 0.2 to 1.1 mm from the cutting edge had the color of the wear-indicating layer (for example, in the coating No. 18, gold, i.e., the color of TiN), and the region A1 lying on the rake face and extending to a distance of 0.2 to 1.1 mm from the cutting edge and the flank face (including the cutting edge) had the color of the base layer (for example, in the coating No. 18, black, i.e., the color of $Al_2O_3$) (refer FIG. 5). The distance of 0.2 to 1.1 mm is an average value. The average value was expressed in such a range for the same reason as that in Example 1. Incidentally, the distance at the R/2 position was 0.42 mm.

(Treatment Processes J2 to J5)

The same treatment process as the treatment process J1 was performed except that the region A1 was defined as a region that extended to a distance of 0 to 1.1 mm from the cutting edge over the rake face (the distance at the R/2 position being 0.42 mm, the same as that in the treatment process J1). The inclusion of 0 mm in the distance from the cutting edge means that the wear-indicating layer is formed on the rake face and in the region A1 (in other words, the region A1 includes a portion where the wear-indicating layer is not removed). The treatment processes J2 to J5 differ from each other in that different residual stresses are imparted as shown in Tables XIII and XIV below due to varied blasting conditions.

(Treatment Processes J6 and J7)

With respect to the coating, the same treatment by blasting as that in the treatment processes J2 to J5 was performed (the distance at the R/2 position being 0.42 mm, the same as that in the treatment processes J2 to J5), and then a treatment by brushing (using a diamond brush) was performed on the region which had been subjected to blasting. The treatment processes J6 and J7 differ from each other in that different residual stresses are imparted as shown in Tables XIII and XIV below due to varied blasting conditions.

(Treatment Process K1)

With respect to the coating, the wear-indicating layer formed over the entire surface of the flank face and formed on the rake face in a region A1 extending to a distance of 0.2 to 2.3 mm from the cutting edge was removed by blasting. Consequently, a region A2 lying on an area of the rake face other than that of the region A1 extending to a distance of 0.2 to 2.3 mm from the cutting edge had the color of the wear-indicating layer (for example, in the coating No. 18, gold, i.e., the color of TiN), and the region A1 lying on the rake face and extending to a distance of 0.2 to 2.3 mm from the cutting edge and the flank face (including the cutting edge) had the color of the base layer (for example, in the coating No. 18, black, i.e., the color of $Al_2O_3$) (refer FIG. 5). The distance of 0.2 to 2.3 mm is an average value. The average value was expressed in such a range for the same reason as that in Example 1. Incidentally, the distance at the R/2 position was 1.35 mm.

(Treatment Process K2)

With respect to the coating, the wear-indicating layer formed over the entire surface of the flank face and formed on the rake face in a region A1 extending to a distance of 0 to 2.3 mm (the distance at the R/2 position being 1.35 mm, the same as that in the treatment process K1) from the cutting edge was removed by brushing (using a diamond brush). Subsequently, the same treatment by blasting as that in the treatment process K1 was performed on the region which had been subjected to brushing. The inclusion of 0 mm in the distance from the cutting edge means that the wear-indicating layer is formed on the rake face and in the region A1 (in other words, the region A1 includes a portion where the wear-indicating layer is not removed).

(Treatment Process K3)

With respect to the coating, a treatment by barrel processing was performed on a region corresponding to the region on which brushing was performed in the treatment process K2 (the distance at the R/2 position being 1.35 mm, the same as that in the treatment process K1), and then a treatment by brushing (using a diamond brush) was performed on the region which had been subjected to barrel processing to remove the wear-indicating layer.

In such a manner, 46 indexable inserts Nos. 131 to 176 shown in Tables XIII and XIV were produced. In Tables XIII and XIV, those marked with asterisk "*" are examples of the present invention, and the coating No. denotes the coating Nos. 18 to 22 described above. In the indexable insert in each of the examples, compressive residual stress can be imparted to the region subjected to blasting or blasting combined with brushing (or barrel processing combined with brushing) (i.e., the region in which the wear-indicating layer is not disposed on the base layer and which includes the area that participates in cutting). (In such a case, the region other than this region has tensile residual stress.) Tables XIII and XIV show the value of residual stress measured as in Example 3.

With respect to the treatment processes J1 to J7 and the treatment processes K1 to K3, the proportion of the region where, at the cutting edge participating in cutting, instead of the alumina layer ($\alpha$-$Al_2O_3$ layer or $\gamma$-$Al_2O_3$ layer) which was the outermost layer in the base layer, the underlying layer of the alumina layer (the underlying layer being a part of the base layer) was exposed was calculated by the same method as that in Example 3. As a result, in the treatment processes J1 to J5 and the treatment process K1, in the cutting edge participating in cutting, the alumina layer was not removed at all (i.e., the underlying layer 121 was not exposed), while in the treatment processes J6, J7, K2, and K3, the underlying layer 121 was exposed to the surface at a ratio of 32%, 69%, 100%, and 22%, respectively, in the cutting edge participating in cutting.

With respect to the indexable inserts Nos. 131 to 176, a continuous turning test and an intermittent turning test were performed under the following conditions, and the flank face wear and fracture rate of the indexable insert were measured. Furthermore, under the following conditions, the welding of the workpiece material on the cutting edge, the state of the machined surface of the workpiece, and the identification of use of the cutting edge were checked. The results thereof are shown in Tables XIII and XIV below. In the flank face wear, a smaller numerical value indicates higher wear resistance. In the fracture rate, a smaller numerical value indicates higher toughness.

(Conditions of Continuous Turning Test)
Workpiece: FCD450 block
Cutting speed: 220 m/min
Feed: 0.20 mm/rev
Depth of cut: 2.0 mm
Lubricant: water-soluble oil
Cutting length: 0.5 m Under these conditions, the welding of the workpiece material on the cutting edge and the state of the machined surface of the workpiece at 0.5 m after the start of cutting were observed, and the flank face wear was measured.

(Conditions of Intermittent Turning Test)
Workpiece: S50C block (with slits)
Cutting speed: 110 m/min
Feed: 0.40 mm/rev
Depth of cut: 2.0 mm
Lubricant: None
Cutting length: 1 m The fracture rate was calculated from the number of fractures when 20 cutting edges were used for cutting one meter. That is, fracture rate (%)=n/20, wherein n represents the number of fractured cutting edges.

TABLE XIII

|   | Indexable insert No. | Coating No. | Treatment process | Residual stress (Gpa) | Flank face wear (mm) | Fracture rate (%) | Welding of workpiece material on cutting edge | Machined surface of workpiece | Identification of use of cutting edge |
|---|---|---|---|---|---|---|---|---|---|
|   | 131 | 18 | A | 0.23 | 0.215 | 100 | Large | Cloudy | Easy |
|   | 132 | 18 | B | 0.23 | 0.211 | 100 | Large | Cloudy | Easy |
|   | 133 | 18 | C | 0.01 | 0.198 | 85 | (Note 1) | (Note 2) | Difficult |
| * | 134 | 18 | J1 | −0.34 | 0.176 | 50 | None | (Note 3) | Easy |
| * | 135 | 18 | K1 | −1.23 | 0.175 | 35 | None | (Note 3) | Easy |
|   | 136 | 18 | G | 0.01 | 0.174 | 80 | None | (Note 3) | Difficult |
|   | 137 | 19 | A | 0.20 | 0.225 | 100 | Large | Cloudy | Easy |
|   | 138 | 19 | B | 0.20 | 0.223 | 100 | Large | Cloudy | Easy |
|   | 139 | 19 | C | 0.03 | 0.192 | 85 | (Note 1) | (Note 2) | Difficult |
| * | 140 | 19 | J1 | −0.52 | 0.184 | 55 | None | (Note 3) | Easy |
| * | 141 | 19 | K1 | −1.15 | 0.180 | 45 | None | (Note 3) | Easy |
|   | 142 | 19 | G | 0.03 | 0.182 | 80 | None | (Note 3) | Difficult |
|   | 143 | 20 | A | 0.18 | 0.205 | 100 | Large | Cloudy | Easy |
|   | 144 | 20 | B | 0.18 | 0.202 | 100 | Large | Cloud | Easy |
|   | 145 | 20 | C | 0.04 | 0.198 | 80 | (Note 1) | (Note 2) | Difficult |
| * | 146 | 20 | J1 | −0.44 | 0.163 | 50 | None | (Note 3) | Easy |
| * | 147 | 20 | J2 | 0.03 | 0.168 | 75 | None | (Note 3) | Easy |
| * | 148 | 20 | J3 | −0.02 | 0.164 | 55 | None | (Note 3) | Easy |
| * | 149 | 20 | J4 | −1.25 | 0.162 | 45 | None | (Note 3) | Easy |
| * | 150 | 20 | J5 | −3.25 | 0.158 | 25 | None | (Note 3) | Easy |
| * | 151 | 20 | J6 | −1.22 | 0.141 | 35 | None | (Note 3) | Easy |
| * | 152 | 20 | J7 | −1.22 | 0.138 | 35 | None | (Note 3) | Easy |

(Note 1) Small amount of welding on rake face
(Note 2) Almost close to specular
(Note 3) Close to specular and most lustrous

TABLE XIV

|   | Indexable insert No. | Coating No. | Treatment process | Residual stress (Gpa) | Flank face wear (mm) | Fracture rate (%) | Welding of workpiece material on cutting edge | Machined surface of workpiece | Identification of use of cutting edge |
|---|---|---|---|---|---|---|---|---|---|
| * | 153 | 20 | K1 | −0.75 | 0.160 | 60 | None | (Note 3) | Easy |
| * | 154 | 20 | K2 | −2.14 | 0.134 | 20 | None | (Note 3) | Easy |
| * | 155 | 20 | K3 | −0.31 | 0.148 | 50 | None | (Note 3) | Easy |
|   | 156 | 20 | G | 0.04 | 0.169 | 75 | None | (Note 3) | Difficult |
|   | 157 | 21 | A | 0.24 | 0.176 | 100 | Large | Cloudy | Easy |
|   | 158 | 21 | B | 0.24 | 0.175 | 100 | Large | Cloudy | Easy |
|   | 159 | 21 | C | 0.05 | 0.169 | 90 | (Note 1) | (Note 2) | Difficult |
| * | 160 | 21 | J1 | −0.41 | 0.151 | 55 | None | (Note 3) | Easy |
| * | 161 | 21 | J2 | 0.04 | 0.150 | 70 | None | (Note 3) | Easy |
| * | 162 | 21 | J3 | −0.02 | 0.152 | 60 | None | (Note 3) | Easy |
| * | 163 | 21 | J4 | −1.27 | 0.150 | 55 | None | (Note 3) | Easy |
| * | 164 | 21 | J5 | −3.24 | 0.146 | 30 | None | (Note 3) | Easy |
| * | 165 | 21 | J6 | −1.25 | 0.129 | 35 | None | (Note 3) | Easy |
| * | 166 | 21 | J7 | −1.25 | 0.121 | 30 | None | (Note 3) | Easy |
| * | 167 | 21 | K1 | −0.77 | 0.153 | 65 | None | (Note 3) | Easy |
| * | 168 | 21 | K2 | −2.11 | 0.112 | 10 | None | (Note 3) | Easy |
| * | 169 | 21 | K3 | −0.32 | 0.127 | 60 | None | (Note 3) | Easy |
|   | 170 | 21 | G | 0.05 | 0.158 | 85 | None | (Note 3) | Difficult |
|   | 171 | 22 | A | 0.18 | 0.191 | 100 | Large | Cloudy | Easy |
|   | 172 | 22 | B | 0.18 | 0.188 | 100 | Large | Cloudy | Easy |
|   | 173 | 22 | C | 0.07 | 0.184 | 85 | (Note 1) | (Note 2) | Difficult |
| * | 174 | 22 | J1 | −0.52 | 0.157 | 50 | None | (Note 3) | Easy |
| * | 175 | 22 | K1 | −1.19 | 0.154 | 45 | None | (Note 3) | Easy |
|   | 176 | 22 | G | 0.07 | 0.159 | 85 | None | (Note 3) | Difficult |

(Note 1) Small amount of welding on rake face
(Note 2) Almost close to specular
(Note 3) Close to specular and most lustrous In Tables XIII and XIV, those marked with asterisk "*" are examples of the present invention. The outermost layer of the base layer is black regardless of the type of coating. With respect to the wear-indicating layer, TiN is gold, and TiCN is pink.

As is evident from Tables XIII and XIV, in the indexable inserts according to the examples of the present invention, the identification of use of the cutting edge (cutting part) is easy, exhibiting a very excellent alerting function, the workpiece material is not welded on the cutting edge, and the machined surface of the workpiece is close to specular. Furthermore, in each of the indexable inserts according to the examples of the present invention, the relationship 0.8>A/B was satisfied, wherein A (μm) represents the surface roughness Ra of the region A1, and B (μm) represents the surface roughness Ra of the region A2 (the measurement method was the same as that for No. 134 which will be described below).

In contrast, with respect to the indexable inserts according to comparative examples (those not marked with asterisk "*" in the tables), in the indexable inserts subjected to the treatment process A or B, although the identification of use of the cutting edge is possible, the workpiece material is welded in a large amount on the cutting edge, the machined surface of the workpiece is cloudy, the flank face wear is large, and the fracture rate is high. In the indexable insert subjected to the treatment process G, although the state of the machined surface of the workpiece, etc. are satisfactory, the identification of use of the cutting edge is difficult, and the alerting function is not exhibited. In the indexable insert subjected to the treatment process C, although the amount of welding of the workpiece material is considerably low, a slight amount of welding occurs in the rake face.

As is evident from the results descried above, the indexable inserts according to the examples of the present invention are highly advantageous over the indexable inserts according to the comparative examples. Consequently, it has been confirmed that in order to prevent the welding phenomenon between the indexable insert and the workpiece and to prevent the appearance of the workpiece from being impaired, it is effective to use a structure in which the wear-indicating layer is disposed, not on the flank face, but on the rake face in a specific region (i.e., the region A2 other than the region A1), and at least one layer (the alumina layer described above) constituting the base layer has compressive residual stress in at least a part of an area in which the wear-indicating layer is not disposed and which participates in cutting. It has also been confirmed that at the cutting edge which participates in cutting, if a layer other than the alumina layer, which is the outermost layer of the base layer, is exposed to the surface, the welding of the workpiece material is further prevented, and more excellent wear resistance is exhibited. Furthermore, although the indexable inserts provided with chip breakers are shown in this example, the present invention is also effective to indexable inserts not provided with chip breakers.

Furthermore, indexable inserts Nos. 134-2, No. 134-3, and No. 134-4 according to the present invention were produced by the same method as that of the indexable insert No. 134 except that the region A1 was subjected to treatment by blasting of varied degrees. The surface roughness Ra of the region A1 and the surface roughness Ra of the region A2 are shown in Table XV. The surface roughness Ra was measured using a laser microscope (VK-8510, manufactured by KEYENCE Corporation). In the region A1, the measurement was performed at the point where the distance from the cutting edge corresponded to a half of the width of the region A1 (i.e., at the center of the region A1). In the region A2, the measurement was performed at the point which was apart from the border between the region A1 and the region A2 toward the region A2, by a distance equal to a half of the width of the region A1, and which was parallel to the border. The measurement distance was 100 μm.

With respect to the indexable inserts Nos. 134, 134-2, 134-3, and 134-4, a turning test was performed under the following conditions, and the surface roughness Rz of the workpiece was measured in the same manner as that Example 1. The results thereof are shown in Table XV.
(Conditions of Turning Test)
Workpiece: S15C block
Cutting speed: 100 m/min
Feed: 0.20 mm/rev
Depth of cut: 1.0 mm
Lubricant: None
Cutting length: 0.5 m The surface roughness Rz of the workpiece at 0.5 m after the start of cutting was measured.

TABLE XV

| Indexable insert No. | Surface roughness Ra | | A/B | Surface roughness of workpiece (Rz) |
|---|---|---|---|---|
| | Region (A1) Aμm | Region (A2) Bμm | | |
| 134 | 0.22 | 0.35 | 0.63 | 2.1 |
| 134-2 | 0.32 | 0.35 | 0.91 | 2.7 |
| 134-3 | 0.16 | 0.36 | 0.44 | 1.9 |
| 134-4 | 0.04 | 0.29 | 0.14 | 1.7 |

As is evident from Table XV, as the value A/B decreases, the surface roughness Rz of the workpiece becomes more satisfactory, wherein A (μm) represents the surface roughness Ra of the region A1, and B (μm) represents the surface roughness Ra of the region A2.

As is evident from the results, in order to prevent the welding phenomenon between the indexable insert and the workpiece and to prevent the appearance of the workpiece from being impaired, it is effective to set the value A/B so as to satisfy the relationship 1.0>A/B, wherein A (μm) represents the surface roughness Ra of the region A1, and B (μm) represents the surface roughness Ra of the region A2. It is more effective to further decrease the A/B value so as to satisfy the relationship 0.8>A/B, and still more effective to decrease the A/B value so as to satisfy the relationship 0.6>A/B.

Although in the examples described above, the indexable inserts for turning and milling are shown, the present invention is also applicable to indexable inserts for drilling, indexable inserts for end milling, indexable inserts for metal-slitting saw machining, indexable inserts for gear-cutting tool machining, indexable inserts for reamer machining, indexable inserts for tap machining, indexable inserts for crankshaft pin milling, and the like, in which the advantages of the present invention are displayed.

The embodiments and examples of the present invention described above may be combined appropriately, which is also assumed in the present invention.

The embodiments and examples which have been disclosed herein are illustrative only and not to be construed as limiting the scope of the present invention. The invention is not limited by the illustrative embodiments, but only by the scope of the appended claims, and it should be understood that various modifications may be made within the scope of the appended claims or the equivalents thereof.

The invention claimed is:

1. An indexable insert comprising:
   a body;
   a base layer disposed on the body; and
   a wear-indicating layer disposed on a part of the base layer,
   wherein at least one surface of the body serves as a rake face, at least one other surface of the body serves as a flank face, the rake face being connected to the flank face with a cutting edge therebetween;
   the base layer has a color different from that of the wear-indicating layer; and
   the wear-indicating layer is disposed on the rake face and on the base layer, the wear-indicating layer is formed over a region A2 entirely or over a portion of A2, and the wear indicating layer is not formed on a region A1 that extends to a distance of 0.2 mm or more and less than 4.0 mm from the cutting edge,
   and said region A2 is a region excluding said region A1 from said rake face.

2. The indexable insert according to claim 1, wherein the wear-indicating layer is disposed on the rake face and further in the region A1.

3. The indexable insert according to claim 1, wherein at least one layer constituting the base layer has compressive residual stress in at least a part of an area in which the wear-indicating layer is not disposed and which participates in cutting.

4. The indexable insert according to claim 3, wherein the absolute value of the compressive residual stress is 0.1 GPa or more.

5. The indexable insert according to claim 1, wherein the relationship 1.0>A/B is satisfied, wherein A (μm) represents the surface roughness Ra of the region A1, and B (μm) represents the surface roughness Ra of the region A2.

6. The indexable insert according to claim 1, wherein the indexable insert has a plurality of cutting edges.

7. The indexable insert according to claim 1, wherein the wear-indicating layer is a layer that is more susceptible to wear than the base layer.

8. The indexable insert according to claim 1, wherein an outermost layer of the base layer is an $Al_2O_3$ layer or a layer containing $Al_2O_3$.

9. The indexable insert according to claim 8, wherein in the base layer, at the cutting edge which participates in cutting, a layer other than the $Al_2O_3$ layer or the layer containing $Al_2O_3$, which is the outermost layer, is entirely or partially exposed to the surface.

10. The indexable insert according to claim 1, wherein an outermost layer of the wear-indicating layer is made of at least one metal (element) selected from the group consisting of Group IVa elements, Group Va elements, and Group VIa elements in the periodic table, Al, Si, Cu, Pt, Au, Ag, Pd, Fe, Co, and Ni, or an alloy containing the metal, or is made of a compound containing at least one element selected from the group consisting of Group IVa elements, Group Va elements, and Group VIa elements in the periodic table, Al, and Si, and at least one element selected from the group consisting of carbon, nitrogen, oxygen, and boron.

11. The indexable insert according to claim 1, wherein the body is made of any one of cemented carbides, cermets, high-speed steels, ceramics, sintered cubic boron nitride compacts, sintered diamond compacts, sintered silicon nitride compacts, and mixtures of aluminum oxide and titanium carbide.

12. The indexable insert according to claim 1, wherein the indexable insert is any one of indexable inserts for drilling, end milling, milling, or turning and inserts for metal-slitting saw machining, gear-cutting tool machining, reamer machining, tap machining, or crankshaft pin milling.

13. An indexable insert comprising:
   a body;
   a base layer disposed on the body; and
   a wear-indicating layer disposed on a part of the base layer,
   wherein at least one surface of the body serves as a rake face, at least one other surface of the body serves as a flank face, the rake face being connected to the flank face with a cutting edge therebetween;
   the base layer has a color different from that of the wear-indicating layer; and
   the wear-indicating layer is disposed on the rake face and on the base layer entirely or partially in a region A2 other than a region A1 that extends to a distance of 0.2 mm or more and less than 4.0 mm from the cutting edge, wherein at least one layer constituting the base layer has compressive residual stress in at least a part of an area in which the wear-indicating layer is not disposed and which participates in cutting.

14. The indexable insert according to claim 13, wherein the absolute value of the compressive residual stress is 0.1 GPa or more.

15. An indexable insert comprising:
   a body;
   a base layer disposed on the body; and
   a wear-indicating layer disposed on a part of the base layer,
   wherein at least one surface of the body serves as a rake face, at least one other surface of the body serves as a flank face, the rake face being connected to the flank face with a cutting edge therebetween;
   the base layer has a color different from that of the wear-indicating layer; and
   the wear-indicating layer is disposed on the rake face and on the base layer entirely or partially in a region A2 other than a region A1 that extends to a distance of 0.2 mm or more and less than 4.0 mm from the cutting edge, wherein the relationship 1.0>A/B is satisfied, wherein A (μm) represents the surface roughness Ra of the region A1, and B (μm) represents the surface roughness Ra of the region A2.

* * * * *

UNITED STATES PATENT AND TRADEMARK OFFICE
CERTIFICATE OF CORRECTION

PATENT NO. : 7,553,113 B2
APPLICATION NO. : 11/813168
DATED : June 30, 2009
INVENTOR(S) : Naoya Omori et al.

It is certified that error appears in the above-identified patent and that said Letters Patent is hereby corrected as shown below:

Title Page, item [73] Assignee: should read as follows:
Sumitomo Electric Hardmetal Corp.

Title Page, under [56] FOREIGN PATENT DOCUMENTS, "JP 58-88501" should be deleted Signed and Sealed this Sixth Day of October, 2009

David J. Kappos
*Director of the United States Patent and Trademark Office*